(12) United States Patent
Li et al.

(10) Patent No.: US 8,654,835 B2
(45) Date of Patent: Feb. 18, 2014

(54) ADAPTIVE VIDEO ENCODER CONTROL

(75) Inventors: Zhen Li, Cupertino, CA (US);
Alexandros Tourapis, Milipitas, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 413 days.

(21) Appl. No.: 13/063,768

(22) PCT Filed: Sep. 16, 2009

(86) PCT No.: PCT/US2009/057117
§ 371 (c)(1),
(2), (4) Date: Mar. 14, 2011

(87) PCT Pub. No.: WO2010/033565
PCT Pub. Date: Mar. 25, 2010

(65) Prior Publication Data
US 2011/0170591 A1    Jul. 14, 2011

Related U.S. Application Data

(60) Provisional application No. 61/097,269, filed on Sep. 16, 2008.

(51) Int. Cl.
*H04N 7/12* (2006.01)

(52) U.S. Cl.
USPC .................................................. 375/240.01

(58) Field of Classification Search
USPC ......................................... 375/240; 382/251
See application file for complete search history.

(56) References Cited

U.S. PATENT DOCUMENTS

| 5,778,192 A | 7/1998 | Schuster |
| 6,167,162 A | 12/2000 | Jacquin |
| 8,326,068 B1 * | 12/2012 | Zhang et al. .................. 382/251 |

(Continued)

FOREIGN PATENT DOCUMENTS

| EP | 1379090 | 1/2004 |
| EP | 1575299 | 9/2005 |
| EP | 1761064 | 3/2007 |
| WO | 9634495 | 10/1996 |

OTHER PUBLICATIONS

ISO/IEC JTC 1, "Coding of Moving Pictures and Associated Audio for Digital Storage Media at up to about 1.5 Mbit/s-Part 2:Video", ISO-IEC 11172 (MPEG-1), Nov. 1993.

(Continued)

*Primary Examiner* — Sath V Perungavoor
*Assistant Examiner* — Chia Lun Hang
(74) *Attorney, Agent, or Firm* — Fish & Richardson P.C.

(57) ABSTRACT

A value of one or more Lagrangian multipliers is adaptively estimate and update based, at least in part, on the video source statistics or dynamic programming. Methods, techniques, and systems involve determining a first Lagrangian multiplier with a video encoder, and updating a second Lagrangian multiplier with the first Lagrangian multiplier. The system can include a Lagrangian multiplier Estimation Module that estimates the Lagrangian multiplier, and a Lagrangian multiplier Update Module that updates the current Lagrangian multiplier using the estimated Lagrangian multiplier. The Online Lagrangian Multiplier Estimation Module may function with Rate Distortion Slope Estimation with Rate Distortion Optimized Mode Decision; Rate Distortion Slope Estimation with Local Approximation; Rate Distortion Slope Estimation with Local Information; or Rate Distortion Slope Estimation with Global Information. The Lagrangian Multiplier Update Module may function with Direct Update; Step Size Update; Sliding Window Update; or Periodical Update.

20 Claims, 6 Drawing Sheets

(56) References Cited

U.S. PATENT DOCUMENTS

| | | | | |
|---|---|---|---|---|
| 2007/0009025 | A1* | 1/2007 | Kwon et al. | 375/240.03 |
| 2007/0019724 | A1* | 1/2007 | Tourapis et al. | 375/240.12 |
| 2007/0127579 | A1* | 6/2007 | Dumitras et al. | 375/240.27 |
| 2008/0212677 | A1* | 9/2008 | Chen et al. | 375/240.16 |
| 2008/0232468 | A1* | 9/2008 | Kwon et al. | 375/240.12 |
| 2009/0086816 | A1* | 4/2009 | Leontaris et al. | 375/240.03 |
| 2009/0225829 | A2* | 9/2009 | Kwon et al. | 375/240.03 |

OTHER PUBLICATIONS

ITU-T and ISO/IEC JTC 1, "Generic Coding of Moving Pictures and Associated Audio Information-Part 2:Video", ITU-T Rec. H.262 and ISO/IEC 13818-2 (MPEG-2). Nov. 1994.

ISO/IEC JTC 1, "Coding of Audio-Visual Objects—Part 2:Visual", ISO/IEC 14496-2 (MPEG-4 Part 2), Jan. 1999.

ITU-T, "Advanced Video Coding for Generic Audiovisual Services", H.264, Mar. 2003.

ITU-T "Video Codec for Audiovisual Services at px64 kbits" ITU-T Recommendation H.261, Mar. 1993.

ITU-T "Video Coding for Low Bit Rate Communication" ITU-T Recommendation H.263, Jan. 1998.

SMPTE 421M, "VC-1 Compressed Video Bitstream Format and Decoding Process" Apr. 2006.

Sullivan, et al., "Rate-distortion Optimization for Video Compression", IEEE Signal Processing Magazine, vol. 15, pp. 74-90, Nov. 1998.

Everett III, Hugh, "Generalized Lagrange Multiplier Method for Solving Problems of Optimum Allocation of Resources" Operations Research, vol. 11, No. 3, May-Jun. 1963, pp. 399-417.

Shoham, et al., "Efficient Bit Allocation for an Arbitrary Set of Quantizers" IEEE Transactions on Acoustics, Speech, and Signal Processing, vol. 36, No. 9, pp. 1445-1453, Sep. 1988.

Chou, et al., "Entropy-Constrained Vector Quantization", IEEE Transactions on Acoustics, Speech, and Signal Processing, vol. 37, No. 1, Jan. 1989, pp. 31-42.

Chou, et al., "Optimal Pruning with Applications to Tree-Structured Source Coding and Modeling" IEEE Transactions on Information Theory, vol. 35, No. 2, Mar. 1989, pp. 299-315.

Chen, et al., "Adaptive Estimation in Lagrangian Rate-Distortion Optimization for Video Coding" in Proceedings of the SPIE International Conference on Visual Communications and Image Processing, vol. 6077, Jan. 15-19, 2006, San Jose, CA.

He, et al., "A Unified Rate-Distortion Analysis Framework for Transform Coding" IEEE Transactions on Circuits and Systems for Video Technology, vol. 11, No. 12, pp. 1221-1236, Dec. 2001.

He, et al., "Optimum Bit Allocation and Accurate Rate Control for Video Coding via p-Domain Source Modeling" IEEE Transactions on Circuits and Systems for Video Technology, vol. 12, No. 10, pp. 840-849, Oct. 2002.

Zhang, et al., "Context Adaptive Lagrange Multiplier for Motion Estimation in JM" JVT-S028, Joint Video Team of ISO/IEC JTC1/SC29/WG11 and ITU-T SG16 Q.6, Mar. 31-Apr. 7, 2006, Geneva Switzerland.

Yi, et al., "A Lagrange Multiplier Selection Method for Rate-Distortion Optimization in H.264/AVC I-Slice Coding" Picture Coding Symposium; Apr. 24, 2006 to Apr. 26, 2006, Beijing.

Pan, et al., "Complexity-based Rate Distortion Optimization with Perceptual Tuning for Scalable Video Coding" Image Processing, 2005. ICIP 2005, IEEE International Conference on Genova, Italy Sep. 11-14, 2005, Piscataway, NJ, USA. vol. 3, No. 11, pp. 37-40.

Kossentini, et al., "Predictive RD Optimized Motion Estimation for Very Low Bit-Rate Video Coding" IEEE Journal on Selected areas in Communications, IEEE Service Center, Piscataway, US, vol. 15, No. 9, Dec. 1, 1997, pp. 1752-1763.

Tourapis, et al., "H.264/MPEG-4 AVC Reference Software Enhancements" 14th meeting: Hong Kong, PRC China Jan. 17-21, 2005.

Wiegand, et al., "Rate-Distortion Optimized Mode Selection for Very Low Bit Rate Video Coding and the Emerging H.263 Standard" IEEE Transactions on Circuits and Systems for Video Technology, vol. 6, No. 2, Apr. 1996, pp. 182-190.

Wiegand, et al., "Lagrange Multiplier Selection in Hybrid Video Coder Control", Proc. 2001 Int. Conf. on Imagee Processing, vol. 3, Oct. 7, 2001, pp. 542-545.

\* cited by examiner

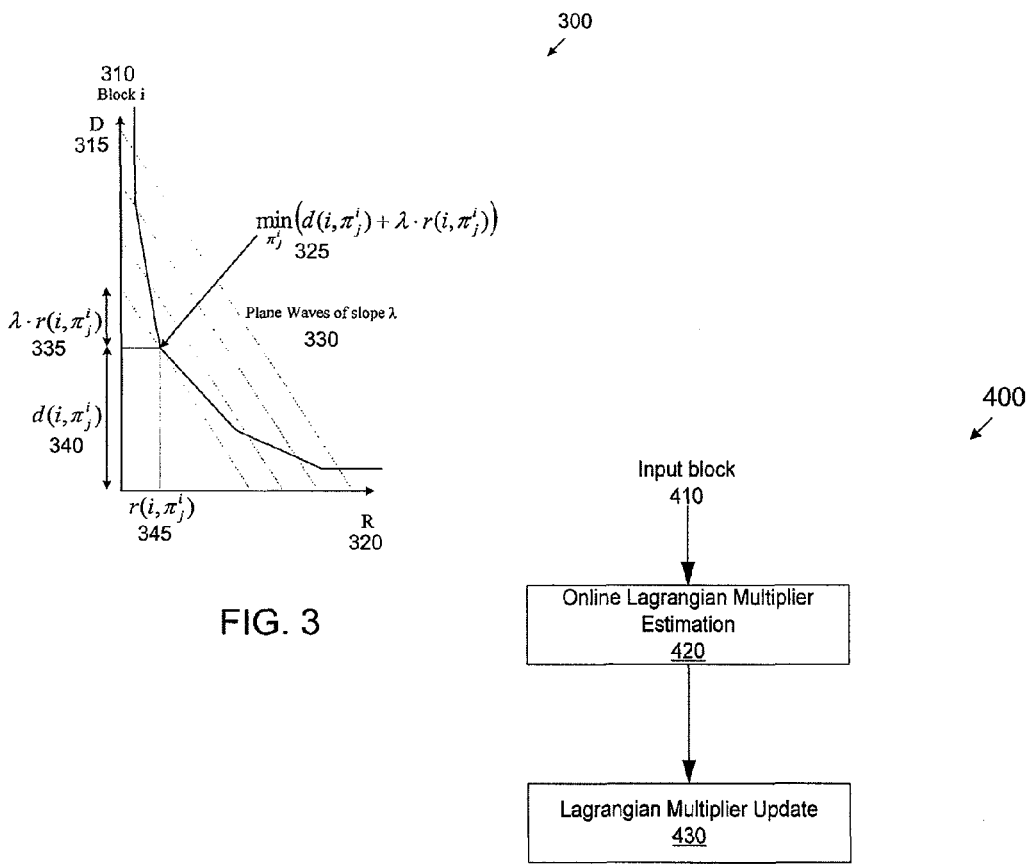
FIG. 3
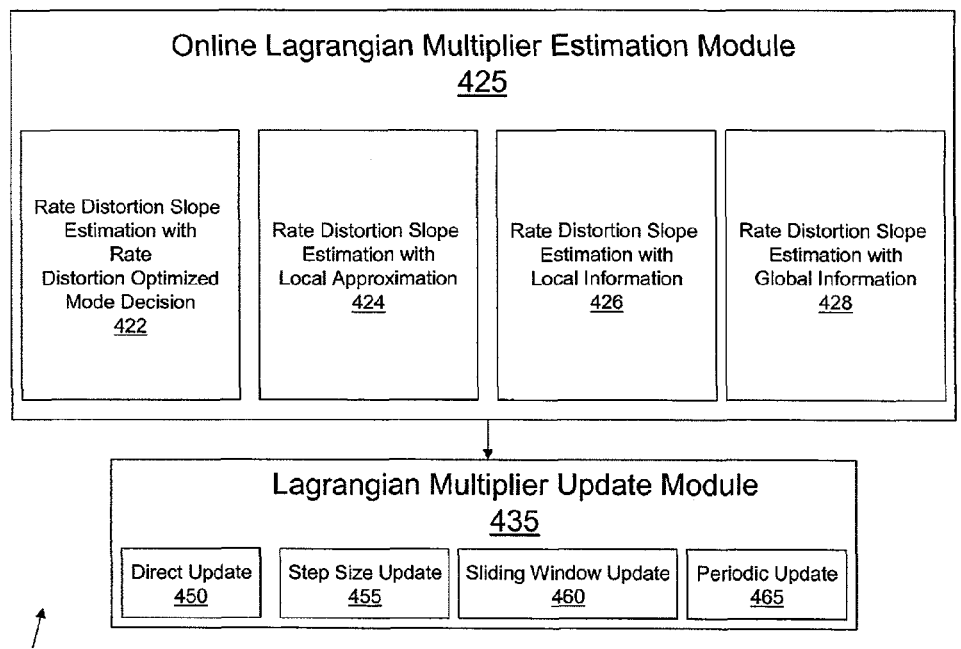
FIG. 4A
FIG. 4B

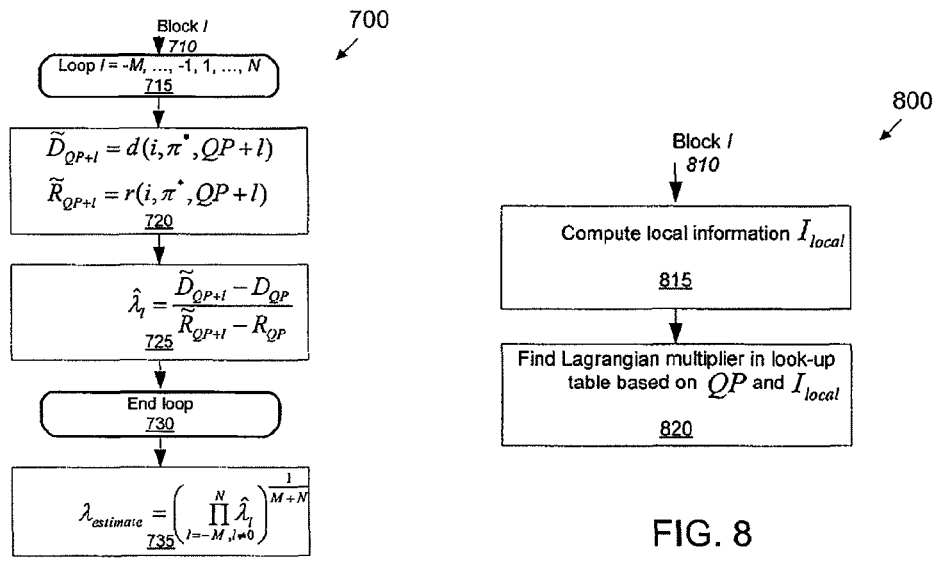
FIG. 7
FIG. 8
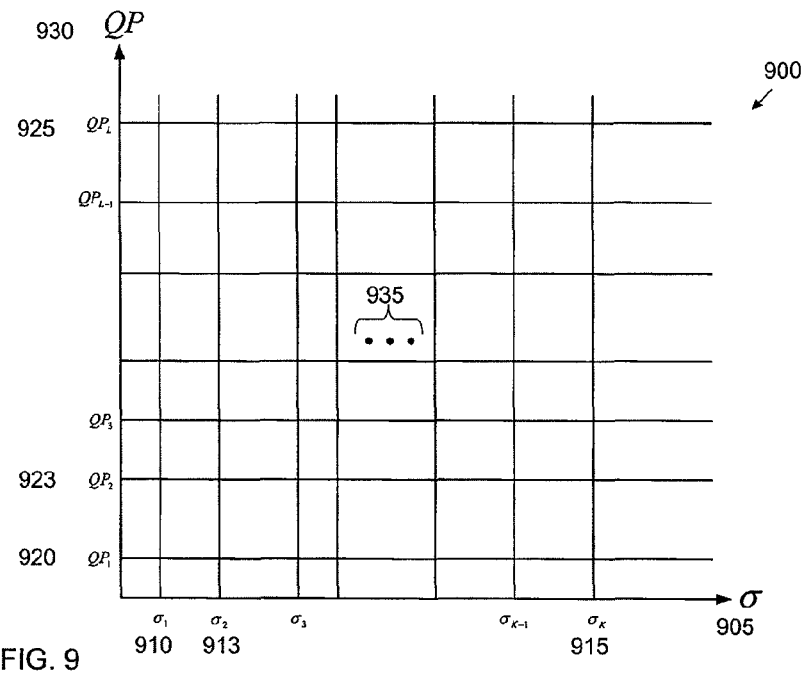
FIG. 9
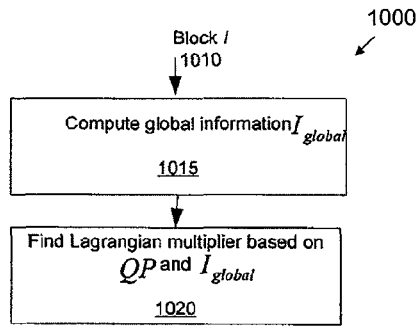
FIG. 10

ADAPTIVE VIDEO ENCODER CONTROL

CROSS-REFERENCE TO RELATED APPLICATIONS

This application claims priority to U.S. Patent Provisional Application No. 61/097,269, filed 16 Sep. 2008, hereby incorporated by reference in its entirety.

TECHNOLOGY

This disclosure relates generally to video technology, and, more particularly, to video coding.

BACKGROUND

As used herein, the term "image feature" may refer to one or more picture elements (e.g., one or more pixels) within a field. As used herein, the term "source field" may refer to a field from which information relating to an image feature may be determined or derived. As used herein, the term "intermediate field" may refer to a field, which may temporally follow or lead a source field in a video sequence, in which information relating to an image feature may be described with reference to the source field. As used herein, the term "disparity estimation" may refer to techniques for computing motion vectors or other parametric values with which motion, e.g., between two or more fields of a video sequence, or other differences between an image, region of an image, block, or pixel and a prediction signal may efficiently be predicted, modeled or described. An example of disparity estimation can be motion estimation. As used herein, the term "disparity estimate" may refer to a motion vector or another estimated parametric prediction related value. As used herein, the term "disparity compensation" may refer to techniques with which a motion estimate or another parameter may be used to compute a spatial shift in the location of an image feature in a source field to describe the motion or some parameter of the image feature in one or more intermediate fields of a video sequence. An example of disparity compensation can be motion compensation. The above terms may also be used in conjunction with other video coding concepts (e.g., intra prediction and illumination compensation).

BRIEF DESCRIPTION OF DRAWINGS

FIG. 3 is a diagram of an example of a Lagrangian optimization function.
FIG. 4A is a flow diagram of an example process for estimating and updating an example of a Lagrangian optimization function.
FIG. 4B depicts an example system for estimating and updating a Lagrangian multiplier.
FIG. 7 depicts a flow diagram for an example of rate distortion slope estimation with local approximation.
FIG. 8 depicts a flow diagram of an example rate distortion slope estimation with local information.
FIG. 9 depicts a diagram showing an example look-up table with coding parameters and local information.
FIG. 10 depicts a flow diagram for an example rate distortion estimation with global information.

Like reference numbers and designations in the various drawings can indicate like elements.

DESCRIPTION OF EXAMPLE EMBODIMENTS

Figure 1:
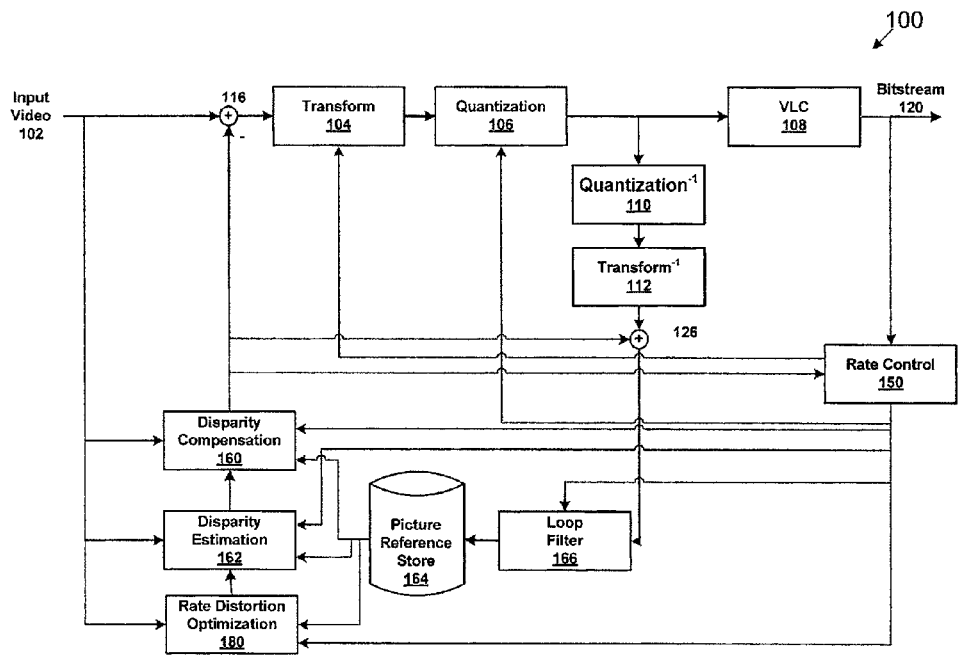
FIG. 1 depicts a diagram of an example of a video encoder.

Example embodiments relating to video compression and video coding are described herein. In the following description, for the purposes of explanation, numerous specific details are set forth in order to provide a thorough understanding of the present invention. It will be apparent, however, that embodiments of the present invention may be practiced without these specific details. In other instances, well-known structures and devices are shown in block diagram form in order to avoid unnecessarily obscuring the present invention. The details of one or more embodiments are set forth in the accompanying drawings and the description below. Other features, objects, and aspects are apparent from the description and drawings, and from the claims.

Overview

Embodiments of the present invention relate to encoding video. A first Lagrangian multiplier is determined with a video encoder and updating a second Lagrangian multiplier with the first Lagrangian multiplier.

These and other embodiments can optionally include one or more of the following features. The first Lagrangian multiplier can be determined at least partially based on a dependency with at least one other coding feature. The coding feature can include a correlation of data samples, a temporal prediction, a spatial prediction, an inter prediction, an intra prediction, a plurality of distortions, or a characteristic of a picture, a region, and/or a frame, in which the characteristic can include texture and/or brightness. The video encoder can include a Lagrangian Multiplier Estimation Module, and the Lagrangian Multiplier Estimation Module can include methods, such as dynamic programming, to generate the first Lagrangian multiplier. The first Lagrangian multiplier can involve computing a rate distortion slope for at least one coding parameter of a rate distortion function. The coding parameter can include any combination of the following: one or more quantization parameters (QPs), one or more frame rates, one or more resolutions, one or more coding layers, a function of one or more QPs, a function of one or more frame rates, a function of one or more resolutions, or a function of one or more coding layers. The method can include DCT-based video coding, wavelet-based video coding, or bit-plane video coding. The first Lagrangian multiplier can be generated at least partially based on one or more characteristics associated with a video display. The first Lagrangian multiplier can be determined at least partially based on at least one video coding characteristic or video coding statistic, in which at least one video coding characteristic and/or video coding statistic can include a measure of accuracy, complexity, efficiency, a coding performance, local information and/or global information.

These and other embodiments can optionally include one or more of the following features. The process of determining the first Lagrangian multiplier can include iteratively generating one or more intermediate Lagrangian multipliers to generate the first Lagrangian multiplier as a function of the at least one video coding characteristic or video coding statistic. The process of determining the first Lagrangian multiplier can involve generating the first Lagrangian multiplier for any combination of different coding parameters for previously-coded macroblocks. Each of the different coding parameters can include any of the following: one or more quantization parameters (QPs), one or more frame rates, one or more resolutions, or one or more coding layers, a function of one or more QPs, a function of one or more frame rates, a function of one or more resolutions, and/or a function of one or more coding layers. The process of determining the first Lagrangian multiplier can include generating an estimate of a slope of a rate distortion curve for at least one coding parameter, and updating the second Lagrangian multiplier with the first Lagrangian multiplier can include replacing the second Lagrangian multiplier with the estimate. The coding parameter can include any combination of the following: one or more quantization parameters (QPs), one or more frame rates, one or more resolutions, one or more coding layers, a function of one or more QPs, a function of one or more frame rates, a function of one or more resolutions, and/or a function of one or more coding layers. The process of determining the third Lagrangian multiplier can involve using a Lagrangian Multiplier Estimation Module of the video encoder. The process of updating of the first Lagrangian multiplier with a replacement of the first Lagrangian multiplier can include the third Lagrangian multiplier. The method can involve computing other Lagrangian multipliers for a number of macroblocks or regions of macroblocks of a picture, and encoding a frame with the video encoder at least partially based on a function of all of the Lagrangian multipliers.

These and other embodiments can optionally include one or more of the following features. The process of determining the first Lagrangian multiplier can involve estimating the first Lagrangian multiplier for a distortion value and a rate value at a coding parameter using rate values and distortion values at coding parameters that neighbor the coding parameter. The coding parameter can include any combination of the following: one or more quantization parameters (QPs), one or more frame rates, one or more resolutions, one or more coding layers, a function of one or more QPs, a function of one or more frame rates, a function of one or more resolutions, and/or a function of one or more coding layers. The rate and distortion values can include a number of QP points, in which the distortion and values for the plurality of QP points can include distortion and rate values $(D_{QP+l}, R_{QP+l})$. Distortion value $D_{QP+l}$ can represent a distortion value at QP+l, wherein rate value $R_{QP+l}$ can represent a rate value at QP+l, where l, M, and N can represent numbers of the QP points, where l can include $-M, \ldots, -1, 1, \ldots N$, and where M and N can be pre-selected or adaptively selected. The pre-selection can be at least partially based on available computational resources, and the adaptive selection can be at least partially based on available computational resources, video sequence characteristics, and/or regional characteristics. The regional characteristics can include characteristics of one or more macroblocks. For each QP point, the method can involve determining a mode where an overall Lagrangian cost function is minimized, and determining corresponding rate and distortion values $(\tilde{D}_{QP+l}, \tilde{R}_{QP+l})$ for the mode. The distortion value $\tilde{D}_{QP+l}$ can represent a distortion value at QP+l, and where rate value $\tilde{R}_{QP+l}$ can represent a rate value at QP+l. The distortion and rate values $(\tilde{D}_{QP+l}, \tilde{R}_{QP+l})$ can be determined for the $-M, \ldots, -1, 1, \ldots N$. The method can involve estimating a slope of a curve at $(D_{QP}, R_{QP})$ using a first order derivative estimation method, in which $D_{QP}$ can represent a distortion value at QP, in which $R_{QP}$ can represent a rate value at QP. The first order derivative estimation method can be a geometric average of a finite difference at the distortion and rate values $(D_{QP}, R_{QP})$. The first Lagrangian multiplier that is estimated can involve $\lambda_{estimate}$, for which $$\lambda_{estimate} = \left( \prod_{l=-M, l \neq 0}^{N} \hat{\lambda}_l \right)^{\frac{1}{M+N}},$$

where $\hat{\lambda}_l$ can be a ratio for l using a difference of distortions and a difference of rates, $$\hat{\lambda}_l = \frac{\tilde{D}_{QP+l} - D_{QP}}{\tilde{R}_{QP+l} - R_{QP}}, l = -M, \ldots, -1, 1, \ldots, N, \text{ and } \prod_{l=-M, l \neq 0}^{N}$$

can represent a mode corresponding to l. The first Lagrangian multiplier that is estimated can involve a comparison of a number of Lagrangian costs for one or more candidate modes to determine the distortion and rate values. For each QP point, the method further can involve searching for a mode where an overall Lagrangian cost function is minimized.

These and other embodiments can optionally include one or more of the following features. In the method, the process of determining the first Lagrangian multiplier can involve performing rate distortion slope estimation with local approximation. The process of performing the rate distortion slope estimation with local approximation can involve determining a mode $\pi^*$ where an overall Lagrangian cost function is minimized for a current coding parameter with a current Lagrangian multiplier $\lambda_{current}$, and determining distortion and rate values $(\tilde{D}_{QP+l}, \tilde{R}_{QP+l})$ for l, where l can include $-M, \ldots, -1, 1, \ldots N$, and l, M, and N can represent numbers for multiple QP points. The distortion value of $\tilde{D}_{QP+l}$ can represent a distortion value at QP+l, and the rate value $\tilde{R}_{QP+l}$ can represent a rate value at QP+l. The method can involve estimating a slope of a curve at $(D_{QP}, R_{QP})$ using a first order derivative estimation method. The distortion value $D_{QP}$ can represent a distortion at QP, and in which $R_{QP}$ can represent a rate at QP. The coding parameter can include any combination of the following: one or more quantization parameters (QPs), one or more frame rates, one or more resolutions, one or more coding layers, a function of one or more QPs, a function of one or more frame rates, a function of one or more resolutions, and/or a function of one or more coding layers. The first order derivative estimation method can be a geometric average of a finite difference at the distortion and rate values $(D_{QP}, R_{QP})$. The first Lagrangian multiplier that is estimated can involve $\lambda_{estimate}$, where $$\lambda_{estimate} = \left( \prod_{l=-M, l \neq 0}^{N} \hat{\lambda}_l \right)^{\frac{1}{M+N}},$$

in which $\hat{\lambda}_l$ can involve a ratio for l using a difference of distortions and a difference of rates, and where $$\hat{\lambda}_l = \frac{\tilde{D}_{QP+l} - D_{QP}}{\tilde{R}_{QP+l} - R_{QP}}, l = -M, \ldots, -1, 1, \ldots, N.$$

A mode for the l can be represented by $$\prod_{l=-M, l \neq 0}^{N}.$$

The method can involve determining the distortion and rate values ($\tilde{D}_{QP+l}, \tilde{R}_{QP+l}$) by setting the distortion value $\tilde{D}_{QP+l}$ as a function of the mode $\pi^*$, a number i for a certain number of QP points, and the quantization parameter QP+l, where distortion value $\tilde{D}_{QP+l}$ includes $\tilde{D}_{QP+l}=d(i,\pi^*,QP+l)$. The method can also include setting the rate value $\tilde{R}_{QP+l}$ as a function of the mode $\pi^*$, the number i for the number of QP points, and the quantization parameter QP+l, where the rate value involves $\tilde{R}_{QP+l}=d(i,\pi^*,QP+l)$. The method can also involve computing $\hat{\lambda}_l$, for which $\hat{\lambda}_l$ can include a ratio corresponding to l by using a difference of distortions and a difference of rate values. The computation of $\hat{\lambda}_l$ can be expressed as $$\hat{\lambda}_l = \frac{\tilde{D}_{QP+l} - D_{QP}}{\tilde{R}_{QP+l} - R_{QP}}, l = -M, \ldots, -1, 1, \ldots, N.$$

These and other embodiments can optionally include one or more of the following features. In the method, the process of determining the first Lagrangian multiplier can involve using local information to estimate the first Lagrangian multiplier. The local information can include a variance, a luma component, a mean of luma component, a chroma component, a motion intensity, texture or edge information, and/or a characteristic or a Lagrangian multiplier of spatially or temporally neighboring areas of a region or macroblock. A coding parameter can involve any combination of the following: one or more quantization parameters (QPs), one or more frame rates, one or more resolutions, one or more coding layers, a function of one or more QPs, a function of one or more frame rates, a function of one or more resolutions, and/or a function of one or more coding layers. The first Lagrangian multiplier can involve using $\lambda_{estimate}$, and determining the first Lagrangian multiplier can include calculating $\lambda_{estimate}$, in which $\lambda_{estimate}$ can be a function of a local estimation method $f_{local}(\cdot)$ for local information $I_{local}$, and $\lambda_{estimate}$ can be expressed as $\lambda_{estimate}=f_{local}(I_{local})$. The method can include, for a macroblock associated with the first Lagrangian multiplier, computing the local information, and determining the first Lagrangian multiplier at least partially based on the computed local information and the coding parameter. The first Lagrangian multiplier can be determined from a Lagrangian multiplier look-up table. In the method, the process of determining the first Lagrangian multiplier can involve generating the Lagrangian multiplier look-up table. The generation of the Lagrangian multiplier look-up table can involve the following: computing a number of variances for an area; estimating a number of Lagrangian multipliers for a number of quantization parameters (QPs); arranging the number of variances into (K+1) groups with K bins; arranging the number of QPs into groups with L bins; computing an average Lagrangian multiplier for each of the groups at least partially based on the K and L bins; and recording the average Lagrangian multipliers within the Lagrangian multiplier look-up table. The method can involve adaptively or periodically updating the Lagrangian multiplier look-up table for two or more areas, slices, and/or scenes.

These and other embodiments can optionally include one or more of the following features. The method may involve using global information to estimate the first Lagrangian multiplier, in which a coding parameter can include any combination of the following: one or more quantization parameters (QPs), one or more frame rates, one or more resolutions, one or more coding layers, a function of one or more QPs, a function of one or more frame rates, a function of one or more resolutions, or a function of one or more coding layers. The global information can include a frame rate, a spatial characteristic, a luma or chroma variance, a DC value, a histogram of a DC value, a current coding structure; metadata information, and/or a hierarchy level within a current Group of Pictures (GOP). The first Lagrangian multiplier can include $\lambda_{estimate}$. The method can involve determining the first Lagrangian multiplier, which includes calculating $\lambda_{estimate}$, where $\lambda_{estimate}$ can be a function of a global estimation method $f_{global}(\cdot)$ for global information $I_{global}$, and where $\lambda_{estimate}$ can be expressed as $\lambda_{estimate}=f_{global}(I_{global})$. The method involving first Lagrangian multiplier can also include computing the global information; and determining the first Lagrangian multiplier at least partially based on the computed global information and a coding parameter. The process of determining the first Lagrangian multiplier at least partially based on the computed global information and the coding parameter can involve adjusting the first Lagrangian multiplier at least partially based on temporal characteristics, sequences, and/or coding differences between pictures or regions. The process of determining the first Lagrangian multiplier can include a function of the coding parameter and a hierarchical level of pictures, in which the first Lagrangian multiplier is $\lambda_k$. The process of determining the first Lagrangian multiplier further can include setting the first Lagrangian multiplier $\lambda_k$ as a function of the hierarchical level, a step size of a change between pictures for a Group of Pictures (GOP), and/or an anchor picture for the GOP, in which k can represent the hierarchical level, $\Delta_{GOP}$ can represent the step size of a change between pictures for the GOP, and $\lambda_{anchor}$ can represent the anchor picture for the GOP, in which $\lambda_k$ can be expressed as $\lambda_k=(1-k\cdot\Delta_{GOP})\cdot\lambda_{anchor}$. The method can further include computing the first Lagrangian multiplier.

These and other embodiments can optionally include one or more of the following features. The process of determining the first Lagrangian multiplier further can include setting the first Lagrangian multiplier $\lambda_k$ as a function of the Lagrangian multiplier of an anchor picture and a ratio of a distance of the anchor picture and a distance in the GOP, in which k can represent the hierarchical level, $\lambda_{anchor}$ can represent the Lagrangian multiplier of anchor picture for the GOP, $d_{anchor}$ can represent the distance of the anchor picture, $d_{GOP}$ can represent the distance in the GOP, and $\lambda_k$ can be expressed as $$\lambda_k = \frac{d_{anchor}}{d_{GOP}} \cdot \lambda_{anchor}.$$

The method can also involve computing the first Lagrangian multiplier using this process. The process of determining the first Lagrangian multiplier also can include determining a Lagrangian multiplier for one or more pictures for a Group of Pictures (GOP) that are at least partially based on a distance to an anchor picture. The first Lagrangian multiplier can be determined from a Lagrangian multiplier look-up table. The Lagrangian multiplier look-up table can be at least partially based on a number of coding parameters. The method may also involve updating the first Lagrangian multiplier at least partially based on one or more of the Lagrangian multipliers in the Lagrangian multiplier look-up table. The first Lagrangian multiplier can include a function of translating a previous hierarchical structure for a Group of Pictures (GOP) with a subsequent hierarchical structure for the GOP. The process of updating the second Lagrangian multiplier with the first Lagrangian multiplier can include estimating the first Lagrangian multiplier with a Lagrangian Multiplier Estimation Module of the video encoder, and replacing the second Lagrangian multiplier with the first Lagrangian multiplier.

These and other embodiments can optionally include one or more of the following features. The process of updating the second Lagrangian multiplier can include changing the second Lagrangian multiplier in a series of Lagrangian steps to change the second Lagrangian multiplier to the first Lagrangian multiplier at an end of the series. The process of updating the second Lagrangian multiplier can include computing an updated second Lagrangian multiplier $\lambda_{new}$ that that is a function of the first Lagrangian multiplier $\lambda_{estimate}$ and the second Lagrangian multiplier $\lambda_{current}$, in which $\lambda_{new}$ can be expressed as $\lambda_{new} = \lambda_{current} + \Delta \cdot (\lambda_{estimate} - \lambda_{current})$, and the $\Delta$ can include a value that is preset or adaptively changed for which $0 < \Delta < 1$. The process of updating the second Lagrangian multiplier can involve placing a limit on a size of an update of the second Lagrangian multiplier by setting an upper bound or a lower bound on updates to the second Lagrangian multiplier. The process of updating the second Lagrangian multiplier can involve computing a sliding window average of a number of Lagrangian multipliers in one or more previous macroblocks and a current macroblock. The method can also involve, for a number of Lagrangian multipliers, selecting a subset of the Lagrangian multipliers for a sliding window of Lagrangian multipliers, and updating the second Lagrangian multiplier as a function of an average of the sliding window.

These and other embodiments can optionally include one or more of the following features. The process of updating the second Lagrangian multiplier with the first Lagrangian multiplier can include updating the second Lagrangian multiplier periodically, in which a period of the update can include a fixed period or an adaptively-changing period. The period can depend on a local context, in which the local context can include motion intensity or scene cut information. The second Lagrangian multiplier can be updated at a start of a slice. The second Lagrangian multiplier can be updated when a scene cut is detected. The process of updating the second Lagrangian multiplier can involve computing a variance of at least two macroblocks with the video encoder, and updating the second Lagrangian multiplier if a change of the variance between two adjacent macroblocks exceeds a threshold value. The process of updating the second Lagrangian multiplier can involve updating the second Lagrangian multiplier for a number of periods, pictures, or regions of a picture. The process of updating the second Lagrangian multiplier can involve executing different types of updates of the second Lagrangian multiplier in a random order or a fixed order, in which the different types of updates can include a direct update, a step size update, and/or a sliding widow update.

These and other embodiments can optionally include one or more of the following features. The process of updating the second Lagrangian multiplier with the first Lagrangian multiplier can include using a Lagrangian Multiplier Update Module of the video encoder. The method may also involve coding a region of the video using the second Lagrangian multiplier. The process of determining the first Lagrangian multiplier can involve computing multiple distortion metrics. The method can include determining a first group of Lagrangian multipliers with the video encoder, and updating a second group of Lagrangian multipliers with the first group of Lagrangian multipliers. Multiple distortion constraints can be employed in determining the first group of Lagrangian multipliers. The process of determining the first group of Lagrangian multipliers can involve computing a rate distortion slope with two or more dimensions and one or more coding parameters. The one or more coding parameters can include any combination of the following: one or more quantization parameters (QPs), one or more frame rates, one or more resolutions, one or more coding layers, a function of one or more QPs, a function of one or more frame rates, a function of one or more resolutions, and/or a function of one or more coding layers.

Any of the methods and techniques described herein can also be implemented in a system with one or more components, an apparatus or device, a machine, a computer program product, in software, in hardware, or in any combination thereof. For example, the computer program product can be tangibly encoded on a computer-readable medium, and can include instructions to cause a data processing apparatus (e.g., a data processor) to perform one or more operations for any of the methods described herein. To illustrate how these techniques can be implemented, several example embodiments are depicted and described.

Systems and Techniques

Video compression systems and standards (e.g., ISO MPEG-1, MPEG-2, MPEG-4, MPEG-4 AVC/ITU-T H.264, MPEG-4 Simple (SP) and Advanced Simple (ASP) profiles, H.261, H.263, AVS, and VC-1, etc.) including scalable (e.g., SVC) and multiview coding systems (e.g., MVC) can provide an approach to store and deliver video contents at a reasonable cost. Video coding optimization can be a component of video compression systems. Video coding optimization can provide high coding efficiency with a quality visual experience. Video coding optimization may consider rate/distortion optimization, which allows joint optimization of both bit rate and distortion for decision making. Alternatively, optimizing may consider distortion or bit rate individually. Optimization may also consider parameters including decoder and/or encoder complexity, which may relate to computation resource availability (e.g., memory state and capacity, power consumption). For example, rate distortion optimization (RDO) can be used to achieve high coding efficiency and visual quality in modern video coding systems.

FIG. 1 depicts a diagram of an example of a video encoder 100. The encoder 100, for example, may be an encoder substantially compliant with the advanced video coding standard (AVC), also referred to as MPEG-4 AVC or ITU-T H.264. In FIG. 1, the input video 102 is sent to an adder 116 that sums the input video frame 102 with an output of a disparity compensation (e.g., motion/illumination change compensation and/or intra-prediction) component 160. The output from the adder 116 is coupled to a transform component 104, followed by a quantization component 106. The output of the quantization component 106 is coupled to a variable length coding (VLC) component 108 and an inverse quantization component 110. The bit stream 120 results from the VLC component 108. Information about the encoding process, such as the number of bits required to encode a block, region, or image, and the distortion introduced by such decision, are sent to the loop filter 166 and other components.

The disparity compensation component 160 can generate a prediction signal given information/decisions from the disparity estimation component 162. The disparity estimation component 162 can perform tasks that may include: (a) determining the appropriate prediction parameters such as motion vectors, illumination change parameters, and/or intra prediction modes, (b) selectively enabling and disabling motion-compensation block-sizes; (c) using certain pictures as motion-compensation references; (d) adjusting the motion estimation search range, refinement patterns, and/or the number of motion estimation iterations; and (e) limiting the number of coding modes to be tested given some predefined conditions or information about the image, among others. The loop filter component 166 can perform tasks that may include: (a) adjusting the parameters of the in-loop deblocking filter; (b) switching-off the deblocking filter, among others.

The rate distortion optimization component 180 receives the input video 102 and the output from the disparity compensation component 160 to send rate distortion optimization information to the disparity estimation component 162. Disparity estimation can be characterized by a balance between minimizing the motion compensation (or prediction) error, while maximizing the coherence of the motion field. The coherence of the motion field can be expressed in terms of the motion field's smoothness. The motion for coherent objects is expected to be smooth with each object so that the motion field is only discontinuous at object boundaries. These object boundaries can be referred to as contour edges or silhouette edges.

The inverse transform component 112 receives an input from the inverse quantization component 110 and sends an output to an adder 126. The adder 126 receives the signal from the inverse transform component 112 and the disparity compensation component 160, and sends a summed signal to a loop filter 166. A picture reference store 164 receives an input from the loop filter 166, and sends an output to the disparity compensation component 160 and the disparity estimation component 162. The disparity estimation component 162 also receives a rate control input from a rate control component 150. The loop filter 166 also receives an input from the rate control component 166. The input video 102 is also sent to an input of the disparity compensation component 160 and the disparity estimation component 262. The rate control component 150 also receives an input from the VLC component 108 and the disparity compensation component 160. The rate control component 150 can send an output to the transform component 104, quantization component 106, disparity compensation 160, and rate distortion optimization component 180.

Figure 2:
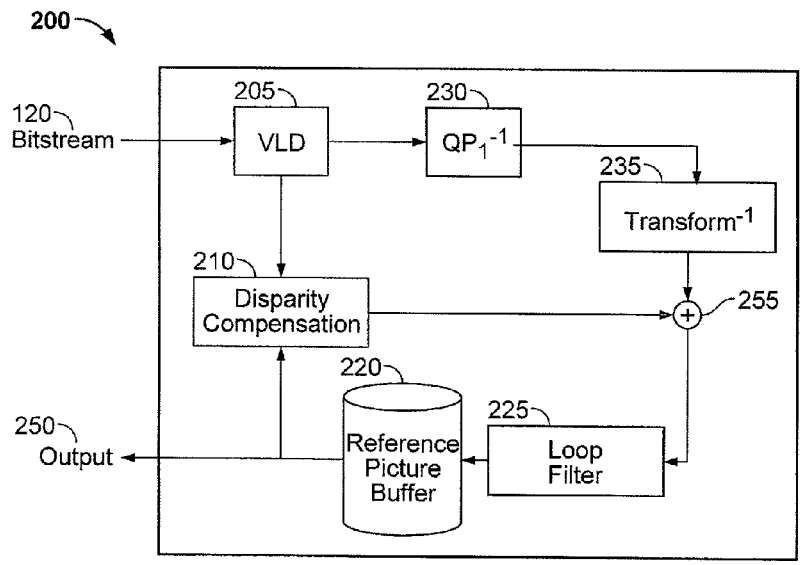
FIG. 2 depicts a diagram of an example of a video decoder.

FIG. 2 depicts a diagram of an example of a video decoder 200. In some embodiments, the decoder 200 may function in substantial conformity with the H.264/MPEG-4 AVC standard. The decoder 200 receives the bit stream 120, and decodes the bit stream using an entropy (variable length) decoder 205, one or multiple inverse quantizers 230, one or multiple inverse transform components 235, and a disparity compensation component 210. The entropy decoder 205 may extract both header information, including disparity information such as modes, motion vectors, illumination change parameters, intra prediction modes, among others, and quantized and transformed residual data. Disparity compensation, and more specifically prediction of the signal, is performed in the disparity compensation component 210 using the header information, while the residual data are first dequantized using the inverse quantizer 230 and then inverse transformed using the inverse transform component 235. An adder 255 adds the output of the inverse transform 255 and the disparity compensator 210, and sends the summed result to a loop filter 225. The output of the loop filter 225 is coupled to a reference picture buffer 220, which can be used for storing pictures for reference and delivering an output 250.

Lagrangian Optimization can be used as a video coding optimization technique. Lagrangian Optimization formulates the video coding optimization issue as the minimization of the Lagrangian cost function. Lagrangian Optimization can be considered as one technique for RDO and can be used in the encoder and/or decoder during disparity estimation, mode decision, complexity allocation, and quantization, and cases where parameters are optimized, among others, to improve coding efficiency and visual quality. In an embodiment, Lagrangian optimization can be used in motion estimation to find the optimal motion vector that minimizes the difference between the original video information and the referenced video information, subject to a bit rate constraint on the motion vector.

FIG. 3 is a diagram depicting an example of a Lagrangian optimization function. The Lagrangian cost function can be expressed as, $$J(\lambda, i, \pi^i_j) = d(i, \pi^i_j) + \lambda \cdot r(i, \pi^i_j), \quad (1)$$

such that $$\Pi^* = (\pi^{1*}, \pi^{2*}, \ldots, \pi^{N*}) = \underset{\Pi}{\operatorname{argmin}} \sum_{i=1}^{N} J(\lambda, i, \pi^{i*}), \quad (2)$$

subject to a rate target $$\sum_{i=1}^{N} r(i, \pi^{i*}) \leq R. \quad (3)$$

The index i is of one of the N blocks or groups of blocks to be optimized, $\pi^i_j$ is the different coding modes, such as different quantizers or prediction modes with j as the index of the coding mode, $d(i,\pi^i_j)$ is the distortion of encoding the block with mode $\pi^i_j$, with $r(i,\pi^i_j)$ as the corresponding rate, and $\lambda$ is referred to as the Lagrangian multiplier, which is a nonnegative real number. $\Pi^* = (\pi^{1*}, \pi^{2*}, \ldots, \pi^{N*})$ that represents modes, where the overall Lagrangian cost functions are minimized.

The diagram depicts a plot 300 of distortion D 315 versus rate R 320, where the minimization of the Lagrangian cost function 325 is depicted with plane waves representing a slope of the Lagrangian multiplier 330. FIG. 3 can indicate an optimal solution when minimizing a Lagrangian cost function given a certain Lagrangian multiplier $\lambda$. In this example, a minimum point of the Lagrangian cost function 325 is at $d(i,\pi^i_j)$ 340 for the distortion of encoding the block with mode $\pi^i_j$, with $r(i,\pi^i_j)$ 345 as the corresponding rate, where $\lambda \times r(i,\pi^i_j)$ 335 is upper distortion range of one of the plane waves. Minimizing the Lagrangian cost function with $\lambda=0$ is essentially equivalent to minimizing the distortion without consideration of the rate. Conversely, minimizing the Lagrangian cost function with $\lambda$ arbitrarily large is essentially equivalent to minimizing the rate without consideration of distortion. Selecting a $\lambda$ value between zero and an arbitrarily large value allows a specific optimal trade-off to be achieved, which balances the rate and distortion requirements. In a video compression system, both the motion vectors and coding modes can be decided with Lagrangian optimization.

When performing Lagrangian optimization in a video encoder, the rate is typically counted according to bits per unit time. Distortion may be computed with various methods. For instance, one such metric, the Sum of Absolute Differences (SAD) for an M×N block, is computed as $$SAD(s, \hat{s}) = \sum_{x=1}^{M} \sum_{y=1}^{N} |s(x, y) - \hat{s}(x, y)|, \quad (4)$$

with s representing an original video block, and ŝ representing the referenced (e.g., prediction samples) or reconstructed block (e.g., prediction+encoded residual information). In some embodiments, when the distortion $d(i, \pi_j^i)$ is measured using a sum of squared differences (SSD), which can be computed for a M×N block as $$SSD(s, \hat{s}) = \sum_{x=1}^{M} \sum_{y=1}^{N} (s(x, y) - \hat{s}(x, y))^2, \quad (5)$$

with s representing an original or initial video block, and ŝ representing the referenced or reconstructed block. λ values that can achieve favorable rate distortion tradeoffs within the context of H.263 and H.264/MPEG-4 AVC respectively are $$\lambda = c \cdot (QP_{H.263})^2, \quad (6)$$

and $$\lambda = c \cdot 2^{(QP_{H.264} - 12)/3}, \quad (7)$$

where c is a constant, and $QP_{H.263}$ and $QP_{H.264}$ are the quantization parameters for codes using these two λ values, respectively. Outside of the H.263 and H.264/MPEG-4 AVC standards, other variations of λ (e.g., outside of equation 5 and equation 6) can be used given usually the quantization process applied. In most implementations, c is selected as a constant and there is an assumption that it is independent of other coding features and/or video characteristics. There may also be an assumption that the region, block, or image for which Lagrangian optimization is applied is independent from other coding decisions. At the same time, the formulation of the Lagrangian multiplier λ as a function of quantization parameters can be approximately interpreted based, at least in part, on source coding theory as follows.

A rate-distortion function that may be approximated at higher rates is expressed as $$R(D) = a \ln\left(\frac{\sigma^2}{D}\right), \quad (8)$$

where a is a constant that depends on the source probability density function (pdf). The minimization of the Lagrangian cost function J in some embodiments for a given value of λ can be achieved by setting a derivative of J with respect to D equal to zero, which yields, $$\frac{dR(D)}{dD} = -\frac{a}{D} \triangleq -\frac{1}{\lambda}, \quad (9)$$

or equivalently, $$\lambda = -\frac{dD}{dR(D)} = \frac{D}{a}. \quad (10)$$

The distortion in high rates can be expressed as $$D \cong \frac{(2 \cdot QP)^2}{12}. \quad (11)$$

Hence, the Lagrangian multiplier can be expressed as $$\lambda \cong c \cdot (QP)^2, \quad (12)$$

where $$c = \frac{4}{12 \cdot a}. \quad (13)$$

In some instances, c can vary and may depend, at least in part, on other coding features and/or video characteristics. For example, there can be a correlation with future and past neighbors. Other potential dependencies may also exist. This may also enhance inter prediction (e.g., temporal prediction) and intra prediction (e.g., spatial prediction). Multiple distortion optimization (e.g., an optimization methodology that considers different distortion constraints with multiple Lagrangian cost functions) and decoder or/and encoder complexity may also be enhanced. Complexity could consider memory required or access, cache misses, number of operations performed, power consumption, and other factors. Temporally, this can also enhance coding performance at various frame rates for fast and/or slow moving images or based, at least in part, on the coding structure used. For example, using hierarchical coding structures may result in different distances between temporal references. The distance differences may also be considered. Some video systems can also consider characteristics between pictures and regions within pictures, such as brightness and texture. Some of these regions may be static and other regions can have motion. Some embodiments herein can also employ dynamic programming techniques in some cases to vary λ and/or c.

The multiplier, λ can be formulated as a function of QP, as noted above, and there can be an algorithm to non-adaptively compute λ in the Lagrangian optimization. However, an adaptive λ can provide performance advantages for coding content with varying characteristics, e.g., temporal, or spatial characteristics.

For instance, in addition to QP, λ may also depend on a, as shown in equations 10 and 13, which may further depend on a source pdf (e.g., λ may be a function of QP and a source pdf). In the embodiments described below, λ is adaptively estimated based, at least in part, on video source statistics and/or other video characteristics.

The distortion in Lagrangian optimization can also be computed using other metrics that can measure subjective visual quality in the Lagrangian optimization. One example of these metrics includes the Just Noticeable Difference (JND), which measures the visibility of artifacts based, at least in part, on the contents. Another example is the Mean Square Difference of Slope (MSDS), which can be used to measure a severity of blocking artifacts that may appear within a scene. In such cases, the formulations of Lagrangian multiplier in equations 6 and 7 no longer holds.

An embodiment also treats scalable coding systems such as quality, spatial, temporal, and/or bit-depth scalable systems, and may be used with video coding systems such as 3-D, multiview, and similar video coding systems.

Embodiments relate to robust Lagrangian multiplier selection techniques. The embodiments allow rate distortion optimizations or rate-distortion-complexity optimizations based, at least in part, on quality metrics that consider human visual system or display characteristics, which may or may not be based, at least in part, on the simpler SAD or SSD metrics. Embodiments may also be used with video coding systems that employ wavelet-based video coding or bit-plane based video coding.

Lagrangian Multiplier Estimation and Update

Embodiments relate to a system that can adaptively estimate and update the value of the Lagrangian multiplier based, at least in part, on the video source statistics. In an example embodiment, this process may involve at least two steps.

FIG. 4A is a flow diagram of an example process 400 for estimating and updating an example of a Lagrangian optimization function. Using an input block (410), the process involves Online Lagrangian Multiplier Estimation (420) to determine the Lagrangian multiplier λ via one or more methodologies, followed by Lagrangian Multiplier Updating to update λ. The actions 420 and/or 430 may be implemented as part of a video encoder and/or have functions that are processed by a video encoder, as in the video encoder of FIG. 1. In some embodiments, an initial Lagrangian multiplier λ can be selected and used, and then for each subsequent region, there is an estimate for a true Lagrangian multiplier $\lambda_{true}$ for the region to be encoded. The initial Lagrangian multiplier λ can be updated as a function of $\lambda_{true}$. One or more example coding actions can be repeated (e.g., in an iterative manner) to determine λ based, at least in part, on some video coding characteristics and/or statistics, such as accuracy, complexity, coding performance, efficiency, etc. In some cases, λ can be improved (e.g., can provide better or refined results according to some metric) on each iteration for these video coding characteristics and/or statistics.

In some embodiments herein, the solutions described for determining λ can be determined empirically (e.g., in contrast to exhaustive determination thereof). System resources to search for λ may be conserved with empirical solutions. λ can be determined and/or updated for pictures or for regions within pictures. In some embodiments, λ can be generated and updated for different coding parameters (e.g., QPs, frame rates, resolutions, coding layers), functions of coding parameters (e.g., functions of QPs, frame rates, resolutions, coding layers), or coding parameters for previously-coded macroblocks. In some example embodiments, the coding parameters can be first determined before finding λ, in which λ can be subsequently updated.

One or more embodiments may estimate and update multiple Lagrangian multipliers for multiple constraints in one or more Lagrangian cost functions. Constraints may include one or more distortion metrics, or one or more quality requirements at different layers in scalable video coding, different views at multi-view, 3-D video coding, and/or different displays, among others. One or more embodiments may estimate and update one Lagrangian multiplier at a time, while fixing the other Lagrangian multipliers. Such a process can continue until part or all of the Lagrangian multipliers are estimated and updated. The proposed techniques can also be used to estimate and update one or more Lagrangian multipliers simultaneously, in which case the Lagrangian multipliers to be estimated and updated can be considered as a vector, where vector parameter estimation methods can be used to estimate and update the Lagrangian multipliers.

FIG. 4B depicts a system 405 for estimating and updating a Lagrangian multiplier. The system includes a Lagrangian multiplier Estimation Module 425 that estimates the Lagrangian multiplier, and a Lagrangian multiplier Update Module 435 that updates the current Lagrangian multiplier using the estimated Lagrangian multiplier. The Estimation Module 425 may use any number of techniques to estimate the multiplier. System 405 may have characteristics, as are described below. For example, the Online Lagrangian Multiplier Estimation Module 425 may function with Rate Distortion Slope Estimation with Rate Distortion Optimized Mode Decision (422); Rate Distortion Slope Estimation with Local Approximation (424); Rate Distortion Slope Estimation with Local Information (426); and/or Rate Distortion Slope Estimation with Global Information (428). The Lagrangian Multiplier Update Module 435 may function to update the multiplier. For example, the Lagrangian Multiplier Update Module 425 may function with Direct Update (450); Step Size Update (455); Sliding Window Update (460); and Periodical Update (465). Lagrangian Multiplier Update Module 425 may function with combinations or sub-combinations of these techniques.

Online Lagrangian Multiplier Estimation

Figure 5:
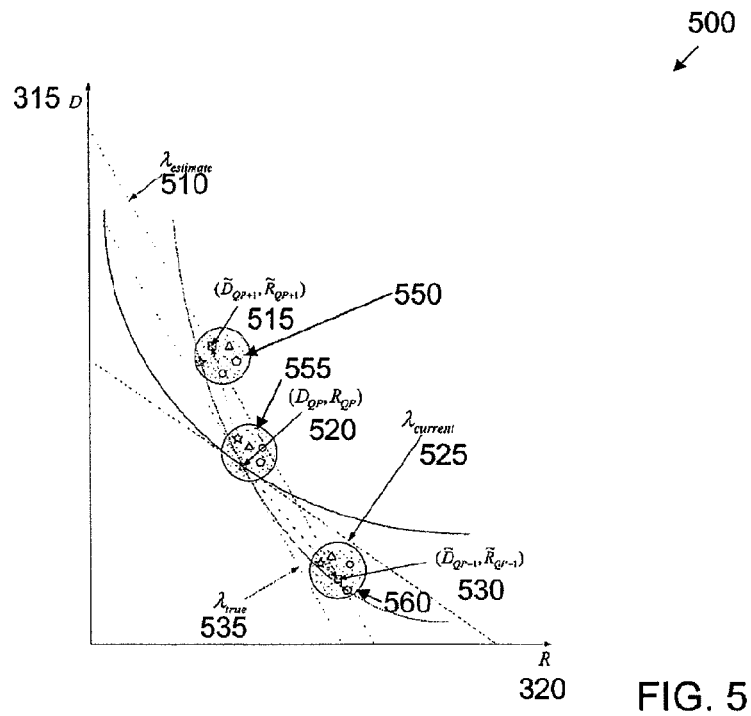
FIG. 5 is a diagram of an example of a Lagrangian optimization function.

Online Lagrangian Multiplier Estimation (420) may function as depicted in FIG. 4A-FIG. 4B. FIG. 5 is a diagram of an example of a Lagrangian optimization function 500. In FIG. 5, distortion D 315 is shown as a function of rate R 320. The minimization of a Lagrangian cost function is depicted with plane waves representing the slope of the Lagrangian multiplier. Different regions 550, 555, 560 in the diagram 400 have information that can be coded multiple times with different coding parameters (e.g. quantization parameters, QPs, frame rates, resolutions, coding layers) for given distortion values and rates. For instance, region 555 has a distortion and rate $(D_{QP}, R_{QP})$ at QP, region 550 has a distortion and rate $(\tilde{D}_{QP+1}, \tilde{R}_{QP+1})$ at QP+1; region 560 has a distortion and rate $(\tilde{D}_{QP-1}, \tilde{R}_{QP-1})$ at QP-1. The Lagrangian multipliers can be computed and may represent the slopes of the respective rate-distortion curves. Other coding parameters, that could be considered in place or in addition to the quantization parameters include motion vectors, modes, quantization offsets or quantization thresholding among others. Instead or in addition to bit rate and distortion, complexity metrics such as memory required/accessed, cache misses, number and/or type of operations, and power consumption, may be considered. A variety of cost metrics for optimization can be considered. These cost metrics may include, instead of or in addition to bit rate, a variety of distortion and complexity metrics, pricing and usage models, or other characteristics. A distinct Lagrangian multiplier may be considered for each included parameter. In some embodiments herein, in order to determine the Lagrangian multipliers, one may consider the slope of the rate-distortion curve in multiple dimensions (e.g., in two or more dimensions). In some embodiments herein, multiple Lagrangian multipliers can be considered for one or more coding metrics, such as multiple distortion and/or complexity metrics, pricing and usage models, or other characteristics.

A Lagrangian multiplier that corresponds with $(D_{QP},R_{QP})$ is $\lambda_{current}$ 525. $\lambda_{current}$ (525) represents the Lagrangian multiplier that is currently being used, and may initially be set, for example, with equation 12. This Lagrangian multiplier can be used on an arbitrary region, including but not limited to a block, a macroblock, a set of macroblocks, a slice, or a group of slices.

An optimal mode $\pi$ can be selected with the resulting distortion and rate denoted as $(D_{QP},R_{QP})$. $\lambda_{current}$ may represent the slope of rate-distortion curve at $(D_{QP},R_{QP})$. However, there is no guarantee that in a practical rate-distortion curve $\lambda_{current}$ is the slope of the curve at the selected point. As shown in FIG. 5, the slope of the rate-distortion curve can vary depending on a number of factors, such as shown in the equations above.

In embodiments, a true slope $\lambda_{true}$ at $(D_{QP},R_{QP})$ can be estimated. The Lagrangian multiplier $\lambda_{current}$ can be updated based, at least in part, on the true slope $\lambda_{true}$ or a function of the true slope $\lambda_{true}$. For example, an initial value of $\lambda$ can be determined based, at least in part, on an initial QP value, and after c is computed (e.g., as in equation 12), another value of $\lambda$ can be determined for a video image in a multi-pass approach. In another example, all of the optimizer values $\lambda$ that have been determined for all of the blocks in a region can be computed in a function (e.g., to compute an average $\lambda$), and a frame can be encoded based, at least in part, on that information (e.g., the average $\lambda$) in a multi-pass approach. In another example, a relationship for $\lambda$ for different QPs or other coding parameters can be determined. Other techniques can be used to estimate the true slope on the rate distortion curve at $(R_{QP},R_{QP})$. Embodiments may function with multiple rate distortion slope estimation techniques used in a separate or joint manner.

1) Rate Distortion Slope Estimation with Complete Rate Distortion Optimized Mode Decision In some embodiments, the true slope $\lambda_{true}$ 535 at $(R_{QP},R_{QP})$ can be estimated with the rate and distortion values from its neighboring QP points. For example, FIG. 5 shows the distortion and rate for QP, QP+l, QP−l. In some embodiments, the rate and distortion values can have various QP points, such as $(D_{QP+l},R_{QP+l})$, l=−M, . . . , −1, 1, . . . N, where M and N can be pre-selected or adaptively selected. The pre-selection can be based, at least in part, on considerations that account for available computational resources, slice or picture coding type, available references and their relationship with the current coding unit among others. The adaptive selection can be based, at least in part, on considerations that consider the currently available computational resources, and video sequence and region characteristics, e.g., the characteristics of neighboring macroblocks, among others.

In some embodiments, for encoders with very limited availability of computational resources, small values of M and N can be assigned. In an embodiment that relates to flat areas, N can be greater than M, e.g., if the value of QP is relatively small. With flat areas, a moderate QP value may suffice to encode the region. Thus, further reduction of the QP value may achieve no significant differences in the resulting rate and distortion values. The rate and distortion values of the neighboring points on the curve can be obtained with a rate-distortion optimized re-encoding with these QPs applied on the same area. In some embodiments, low complexity coding methods may also be considered (e.g., single block size and reference, constrained motion search, low complexity RDO, low complexity entropy coding, etc.)

In FIG. 5, each of the shaded circular regions 550, 555, 560 can represent a complete rate distortion optimized mode decision. For each QP, an optimal mode can be found and the corresponding rate and distortion values $(\tilde{D}_{QP+l},\tilde{R}_{QP+l})$ can be obtained. When $(\tilde{D}_{QP+l},\tilde{R}_{QP+l})$ are obtained for all l=−M, . . . , −1, 1, . . . N, the slope of the curve at $(D_{QP},R_{QP})$ can be estimated using first-order derivative estimation methods.

In some embodiments, the slope can be estimated using the geometric average of the finite difference at $(D_{QP},R_{QP})$, as shown in FIG. 5. In an example, a finite difference of rates and distortions can be computed at $(D_{QP},R_{QP})$ with respect to each $(D_{QP+l},R_{QP+l})$ as, $$\hat{\lambda}_l = \frac{\tilde{D}_{QP+l} - D_{QP}}{\tilde{R}_{QP+l} - R_{QP}}, l = -M, \ldots, -1, 1, \ldots, N. \quad (14)$$

The resulting estimated Lagrangian multiplier can be expressed as $$\lambda_{estimate} = \left(\prod_{l=-M, l\neq 0}^{N} \hat{\lambda}_l\right)^{\frac{1}{M+N}}. \quad (15)$$

Figure 6:
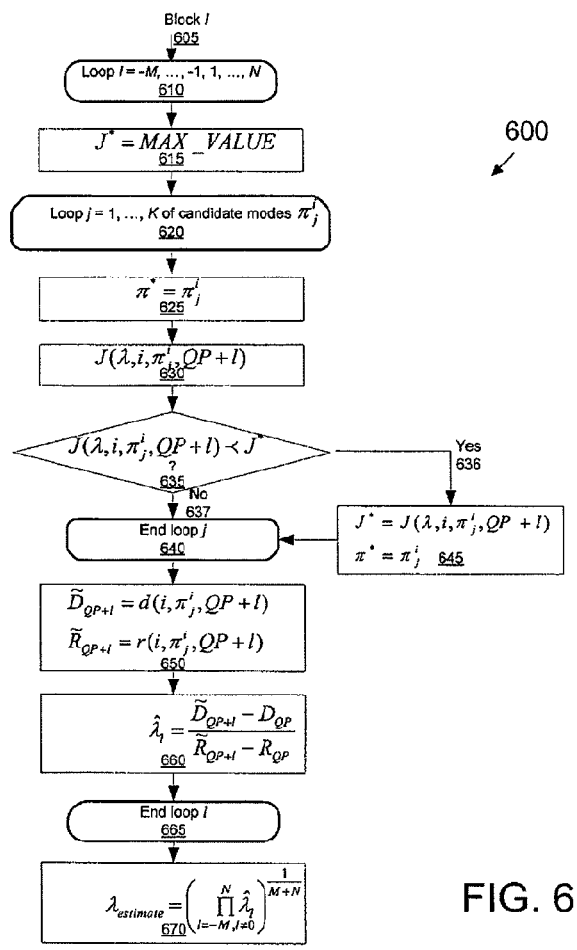
FIG. 6 depicts a flow diagram for an example of rate distortion slope estimation with a rate distortion optimized mode decision.

FIG. 6 depicts a flow diagram for an example of rate distortion slope estimation 600 with a rate distortion optimized mode decision. In the example method of FIG. 6, rate and distortion values can be estimated at neighboring QPs (e.g., QP+l, QP, QP−l). For a selected block, Block I (605), there is a loop for l for the neighboring QPs, where l=−M, . . . , −1, 1, . . . N (610), and an initial Lagrangian cost J* is set to J*=MAX_VALUE (615). There is a loop for j with j=1, . . . , K for candidate modes $\pi^i_j$ (620). A mode for $\pi^*$ is set to $\pi^*=\pi^i_j$ (625) with Lagrangian cost $J(\lambda,i,\pi^i_j,QP+l)$ (630). A decision is then made to determine if the resulting Lagrangian cost function $J(\lambda,i,\pi^i_j,QP+l)$ is smaller than J* (635). If $J(\lambda,i,\pi^i_j,QP+l)$ is smaller than J* (636), then the Lagrangian cost J* is updated to $J(\lambda,i,\pi^i_j,QP+l)$, and $\pi^*$ is set to $\pi^*=\pi^i_j$ (645), and the loop j continues until the Lagrangian cost functions for all candidate modes have been computed (640). If $j(\lambda,i,\pi^i_j,QP+l)$ is larger than or equal to J* (637), then the loop j continues until the Lagrangian cost functions for all candidate modes have been computed (640). Then, the resulting distortion $\tilde{D}_{QP+l}$ for QP+l is set as $\tilde{D}_{QP+l}=d(i,\pi^i_j,QP+l)$ and the corresponding rate for QP+l, $\tilde{R}_{QP+l}$, is set as $\tilde{R}_{QP+l}=d(i,\pi^i_j,QP+l)$ (650). Then, a Lagrangian multiplier is set to $$\hat{\lambda}_l = \frac{\tilde{D}_{QP+l} - D_{QP}}{\tilde{R}_{QP+l} - R_{QP}}, l = -M, \ldots, -1, 1, \ldots, N, \quad (660)$$

as in equation 14. After these steps are done, then loop l ends (665). The resulting estimated Lagrangian multiplier can be expressed as $$\lambda_{estimate} = \left(\prod_{l=-M, l\neq 0}^{N} \hat{\lambda}_l\right)^{\frac{1}{M+N}}, \quad (670)$$

as in equation 15.

2) Rate Distortion Slope Estimation with Local Approximation

The rate distortion slope estimation can be performed with local approximation. In these embodiments, the approximated values for the neighboring points can alleviate requirements for complexity. Instead of searching the optimal modes at different QPs, as described above (e.g., the embodiment for the rate distortion slope estimation with complete rate distortion optimized mode decision), the rate and distortion values $(\tilde{D}_{QP+l}, \tilde{R}_{QP+l})$ can be computed at different QPs under the same mode π*. This mode π* can be the optimal mode (e.g., where the overall Lagrangian cost functions are minimized) for the current QP with $\lambda_{current}$, or a default mode, such as the 16×16 or 8×8 partition mode, and reference. After $(\tilde{D}_{QP+l}, \tilde{R}_{QP+l})$ are obtained for all l=−M, ..., −1, 1, ... N, the slope of the curve at $(D_{QP}, R_{QP})$ can be estimated using first order derivative estimation methods similar to those described above (e.g., the embodiment for the rate distortion slope estimation with complete rate distortion optimized mode decision). Some embodiments for rate distortion slope estimation with local approximation may have low computational complexity and encoding times. FIG. 7 depicts a flow diagram for an example of rate distortion slope estimation 700 with local approximation. For a selected block, Block I (710), there is a loop for l for the neighboring QPs, where l=−M, ..., −1, 1, ... N (715). The distortion $\tilde{D}_{QP+l}$ is set as $\tilde{D}_{QP+l}=d(i,\pi^*,QP+l)$ and the rate $\tilde{R}_{QP+l}$ is set as $\tilde{R}_{QP+l}=d(i,\pi^*,QP+l)$ (720). Then, a Lagrangian multiplier is set to $$\hat{\lambda}_l = \frac{\tilde{D}_{QP+l} - D_{QP}}{\tilde{R}_{QP+l} - R_{QP}}, l = -M, \ldots, -1, 1, \ldots, N \quad (725)$$

and computed, as in equation 15. After these steps are done, the loop lends (730). The resulting estimated Lagrangian multiplier can be expressed as $$\lambda_{estimate} = \left(\prod_{l=-M, l\neq 0}^{N} \hat{\lambda}_l\right)^{\frac{1}{M+N}}, \quad (735)$$

as in equation 15. These concepts can also be extended to multiple Lagrangian parameters.

3) Rate Distortion Slope Estimation with Local Information

In some embodiments, local information (e.g., video coding characteristics and/or statistics) can be used to predict or estimate the Lagrangian multipliers. More specifically, the Lagrangian multiplier can be estimated as $$\lambda_{estimate} = f_{local}(I_{local}), \quad (16)$$

where $f_{local}(\cdot)$ is the local estimation method and $I_{local}$ is the local information. Such information can include the variance, the mean of luma components, the chroma components, the estimated motion intensities, texture and edge information, as well as the characteristics and updated Lagrangian multipliers of spatially and temporally neighboring areas, among others. For certain coding applications, such as scalable coding, this information may include also, quality, resolution, complexity disparity between base and enhancement layer, tone mapping characteristics, and depth disparity as well.

FIG. 8 depicts a flow diagram of rate distortion slope estimation 800 with local information.

In FIG. 8, for a selected block, block I (810), the local information $I_{local}$ is computed (815). The Lagrangian multiplier can then be found in a look-up table and based, at least in part, on QP and $I_{local}$ (820).

In some embodiments, the Lagrangian multiplier can be estimated based, at least in part, on the quantization parameters and the variance of the macroblock as follows. The variance σ of one area can be computed. The optimal Lagrangian multiplier for this area, given a QP parameter, can be estimated with the methods described above for the embodiments that use the rate distortion slope estimation with complete rate distortion optimized mode decision or the embodiments that use rate distortion slope estimation with local approximation. For each pair of (QP, σ) a corresponding optimal Lagrangian multiplier λ(QP,σ) can be recorded. When a sufficiently large set of data has been recorded for λ(QP,σ) the whole variance range can be arranged into (K+1) groups with K bins, denoted as $\sigma_1, \sigma_2, \ldots, \sigma_K$, respectively, and the QPs are arranged into (L+1) groups with L bins, denoted as $QP_1, QP_2, \ldots, QP_L$ respectively.

FIG. 9 depicts a diagram showing an example look-up table 900 with coding parameters and local information. In FIG. 9, a variance range σ 905 is arranged into (K+1) groups with K bins, denoted as $\sigma_1$ 910, $\sigma_2$ 913, ..., $\sigma_K$ 915, respectively, and the QPs 930 is arranged into (L+1) groups with L bins, denoted as $QP_1$ 920, $QP_2$ 923, ..., $QP_L$ 925, respectively. An example bin in the look-up table for the K and L groups is bin 935.

The numbers of bins K and L can be fixed or adaptively changed. The recorded data set can be arranged into (L+1)× (K+1) groups according to these bins. For each group, an average Lagrangian multiplier can be computed as $$\lambda(m,n) = \text{average}\{\lambda(QP,\sigma): \\ QP_{m-1} \leq QP < QP_m, \sigma_{n-1} \leq \sigma < \sigma_n\}, \quad (17)$$

with m=1, ..., L+1, n=1, ..., K+1, $QP_0=0, QP_{L+1}=+\infty, \sigma_0=0, \sigma_{K+1}=+\infty$, and average{ } computes an average of all the λ in the set. If the set is empty, it can return the default value based upon the QP, according to other techniques (e.g., entropy-constrained vector quantization).

After the average is computed for every group, these results can serve as a look-up table for the Lagrangian multiplier. For instance, for each area to be encoded, the variance can be computed first and then allocated to the corresponding group according to the QP to be used. The corresponding Lagrangian multiplier can be used as the estimated Lagrangian multiplier for this area. In some embodiments, the Lagrangian multiplier table can be fixed after it is computed, the Lagrangian multiplier table can be adaptively updated for different areas, slices, scenes, and/or the Lagrangian multiplier table can be periodically updated.

4) Rate Distortion Slope Estimation with Global Information

In some embodiments, global information can be used to predict or estimate the Lagrangian multipliers.

FIG. 10 depicts a flow diagram for rate distortion estimation 1000 with global information. In FIG. 10, for a selected block, block I (1010), the global information $I_{global}$ is computed (1015). Then, the Lagrangian multiplier is set based, at least in part, on QP and $I_{global}$ (1020).

For example, the Lagrangian multiplier can be set as $$\lambda_{estimate} = f_{global}(I_{global}), \quad (18)$$

where $f_{global}(\cdot)$ is the global estimation method and $I_{global}$ is the global information. The global information can include the frame rate, spatial characteristics such as the luma and chroma variance, DC values, and/or the histograms of the DC values, a current coding structure, and/or metadata information. As an example, the Lagrangian multiplier can be estimated based, at least in part, on its hierarchy level within a current Group of Pictures (GOP).

Figure 11:
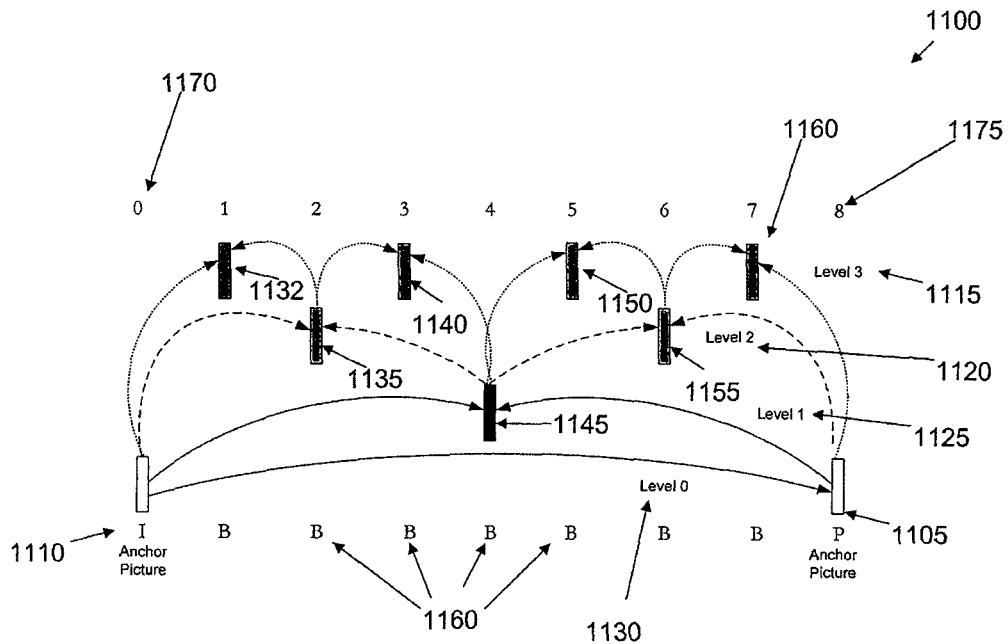
FIG. 11 depicts a diagram with an example Group of Pictures (GOP) with an example hierarchical prediction structure.

FIG. 11 depicts a diagram with a group of pictures with an example hierarchical prediction structure 1000 for groups of 8 pictures. FIG. 11 shows anchor pictures 1105, 1110 and different levels 1130, 1125, 1120, 1115 for pictures (e.g., Level 0, Level 1, Level 2, Level 3). There is a GOP from picture 1170 to picture 1175.

The anchor pictures 1105, 1110 can be either intra-coded or inter-coded pictures by using the anchor pictures as references for motion-compensated prediction. The remaining pictures 1132, 1135, 1140, 1145, 1150, 1155 of the GOP are hierarchically predicted, as shown in FIG. 11. There are three levels 1145, 1120, 1115 for the hierarchical prediction shown in FIG. 11. A picture in the middle 1145, denoted as the first level (Level 1) 1145, is predicted only from the anchor pictures 1105, 1110. The second level (Level 2) 1120 of pictures 1135, 1155 can be predicted from both the anchor pictures 1110, 1105 and the first level of pictures 1145. The remainder of the pictures 1132, 1140, 1150, 1160, denoted as the third level (Level 3) 1115 of pictures, can be predicted from the anchor pictures 1105, 1110, and the first level 1125 and the second level 1120 of pictures. The Lagrangian multiplier for the anchor pictures can be denoted as $\lambda_{anchor}$.

Subjectively, the human psychovisual system (e.g., vision associated with the human eye) can have some temporal masking for different layers. To compensate for this temporal masking, each level 1130, 1125, 1120, 1115 may be coded differently, with the lower levels (e.g., Level 1) having higher quality than the higher levels (e.g., Level 3). Also, the temporal characteristics (e.g., motion differences) can vary for pictures of different levels. Further, different GOPs and sequences (e.g., fast motion sequences or slow motion sequences) may be suited for particular hierarchical coding structures. Hence, the λ can be adjusted and updated to account for these temporal characteristics, sequences, and/or coding differences between pictures, among other factors.

In an embodiment, predicting the Lagrangian multiplier at the same QP for higher level pictures (e.g., Level 3) can include the Lagrangian expression $$\lambda_k = (1 - k \cdot \Delta_{GOP}) \cdot \lambda_{anchor}, \quad (19)$$

where k is the value of the hierarchical level and $\Delta_{GOP}$ is the step size of the change.

In an embodiment, predicting the Lagrangian multiplier at the same QP based, at least in part, on $\lambda_{anchor}$, a distance $d_{anchor}$ from the current picture can be associated with its nearest anchor pictures. This example can be expressed as $$\lambda_k = \frac{d_{anchor}}{d_{GOP}} \cdot \lambda_{anchor}, \quad (20)$$

where $d_{GOP}$ is the size of GOP, which can be 8 in one example. Other pictures can have a λ determined based, at least in part, on a distance to its nearest anchor pictures Some embodiments can function using a previous hierarchical structure and a current hierarchical structure, in which λ can be determined with a translation of the past and current hierarchical structures. In an embodiment, there can be different Lagrangian multipliers for different QPs. The Lagrangian multiplier can be updated based, at least in part, on results in the look-up table. For example, one or more pictures can be re-coded in a multi-pass approach, in which one or more pictures can be initially coded with an initial Lagrangian multiplier, and use the look-up table to re-code an entire frame for a region.

Lagrangian Multiplier Update Module and Techniques

Figure 12:
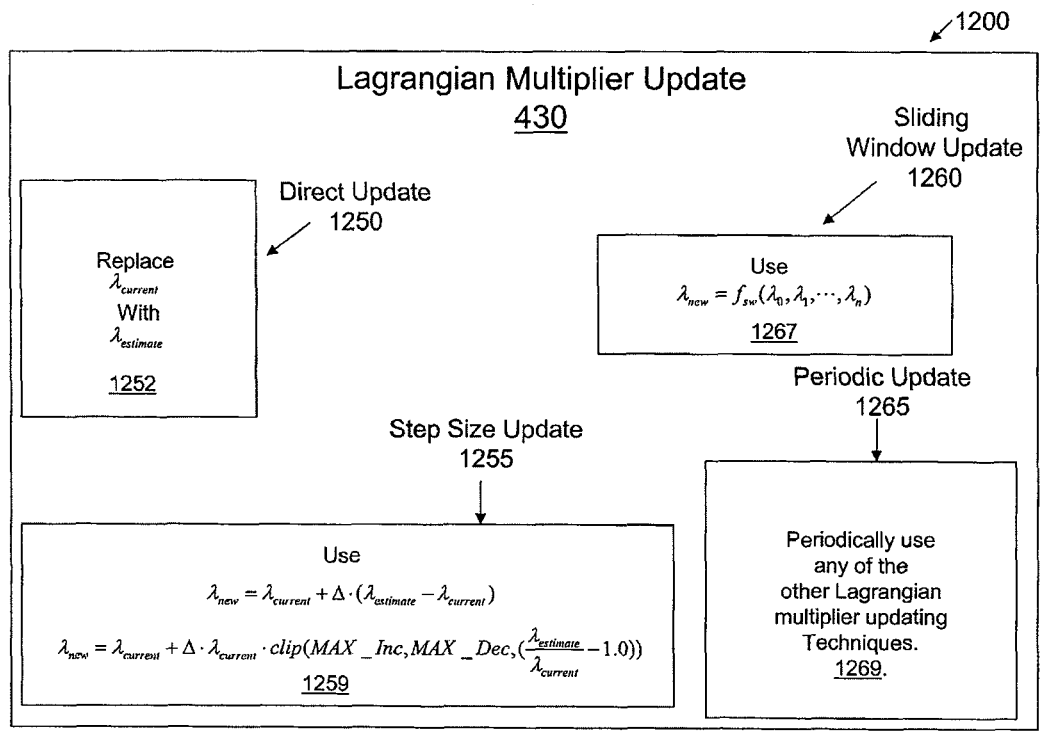
FIG. 12 depicts a block diagram of an example Lagrangian multiplier update module.

After an estimated Lagrangian multiplier $\lambda_{estimate}$ is obtained, it can be used in the Lagrangian Multiplier Update (430) to update a current (or initial) Lagrangian multiplier $\lambda_{current}$. The Lagrangian Multiplier Update Module (430; FIG. 4B) may function with one or more of at least four techniques. FIG. 12 depicts a block diagram of an example Lagrangian multiplier update module 1200. λ can be updated (e.g., replaced) for a block, frame, region, etc. The Lagrangian Multiplier Update Module for updating λ may function with one or more of Direct Update (1250); Step Size Update (1255); Sliding Window Update (1260); and Periodical Update (1265).

1) Direct Update

In this example technique (1250), the current Lagrangian multiplier $\lambda_{current}$ can be replaced with the estimated Lagrangian multiplier $\lambda_{estimate}$. In this method, the current Lagrangian multiplier itself is directly replaced with the estimated multiplier (1252).

2) Step Size Update

In this example technique (1255), the Lagrangian multiplier can be updated as $$\lambda_{new} = \lambda_{current} + \Delta \cdot (\lambda_{estimate} - \lambda_{current}) \quad (21)$$

with step size $0 < \Delta < 1$ (1259). The process of updating the current Lagrangian multiplier involves computing $\lambda_{new}$, where $\lambda_{current}$ represents the current Lagrangian multiplier, $\lambda_{new}$ represents the updated Lagrangian multiplier, $\Delta$ is a value that is preset or adaptively changed, and $\lambda_{estimate}$ represents the estimate of the Lagrangian multiplier.

To deter λ from changing over-aggressively across all macroblocks or other regions, the maximum change in each update step may be limited to be within a range. In an embodiment, λ can be updated as $$\lambda_{new} = \lambda_{current} + \Delta \cdot \lambda_{current} \cdot \text{clip}\left(\text{MAX\_Inc}, \text{MAX\_Dec}, \left(\frac{\lambda_{estimate}}{\lambda_{current}} - 1.0\right)\right) \quad (22)$$

where MAX_Inc and MAX_Dec are the upper and lower bounds of the clip( ) function and can be pre-determined or adaptively changed (1259). For example, when MAX_Inc and MAX_Dec are set to be 0.1 and −0.1 respectively, the Lagrangian multiplier can be increased or decreased by as much as $0.1 \cdot \Delta \cdot \lambda_{current}$.

One or more embodiments, a λ can be slowly phased out until it is replaced by another λ. For example, the current $\lambda_{current}$ can be kept and changed slightly for each step or fraction of a step until the current λ evolves to where it becomes completely replaced with another λ (e.g., the estimated multiplier $\lambda_{estimate}$). One or more embodiments may thus be utilized when it may be helpful for a video application to use the same λ over time until it is appropriate to change to another λ (e.g., when there is noise in a system).

3) Sliding Window Update

In this example technique (1260), the Lagrangian multiplier can be updated based, at least in part, on a "sliding window" average of the Lagrangian multipliers in previous macroblocks and the current macroblock (or other regions)

along with the estimated slope value. Given multiple λs, there can be a number of λs to form a sliding window of λs to determine another λ.

For example, the Lagrangian multiplier can be set as, $$\lambda_{new} = f_{sw}(\lambda_0, \lambda_1, \ldots, \lambda_n), \quad (23)$$

where $f_{sw}(\cdot)$ is an arbitrary sliding window estimation method that can consider the current and previous Lagrangian multipliers, $\lambda_0 = \lambda_{estimate}$, $\lambda_1 = \lambda_{current}$, and $\lambda_k$, $k=2, \ldots, M$ are the Lagrangian multipliers for previous macroblocks or other regions (1267). For example, in some embodiments, $f_{sw}(\cdot)$ can be a function for an average of a number of Lagrangian multipliers.

4) Periodic Update

In this example method (1265), the Lagrangian multiplier can be updated periodically using any of the update methods described above (e.g., direct update 1250, step size update 1255, sliding window update 1260) (1269). The period itself can be pre-determined or set adaptively according to local context, such as motion intensity or scene cut information. The periodic update can have low computational complexity for the video system, especially for areas having similar characteristics.

For example, the Lagrangian multiplier may be updated only at the start of each slice. Other examples may involve first performing scene change detection, and updating the Lagrangian multiplier once a scene cut is detected. Such a periodic update can also be done inside a picture. In some embodiments, the encoder can first compute the variance of each macroblock, while the Lagrangian multiplier update algorithm may be called only when a change of the variance between adjacent macroblocks exceeds certain thresholds. In some embodiments, there may be an update of the Lagrangian multiplier for a certain number of iterations, periods, and/or regions of a picture.

In some embodiments, the Lagrangian multiplier can be updated periodically using any order of the update methods described above (e.g., direct update, step size update, sliding window update). For example, the order can be a random order, an order from one type of update to another, or an order to use different types of updates for different periods. For example, in a direct update 1250 can be used in a first period, a step size update 1255 can be used in a second period, and a sliding window update 1260 can be used in a third period.

Example Systems

Figure 13:
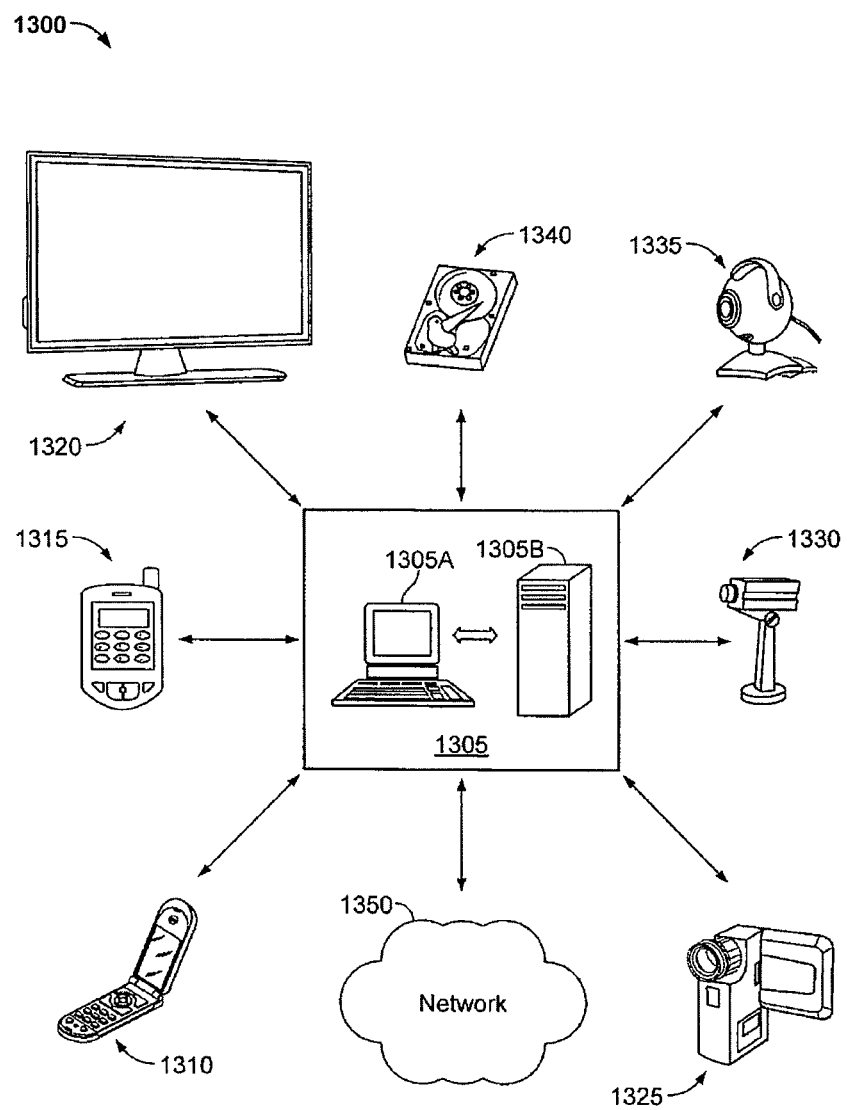
FIG. 13 depicts an example system diagram with the disclosed techniques.

FIG. 13 depicts a system diagram that can employ any (or any combination) of the Lagrangian techniques described herein. Various video coding and/or display components are depicted in FIG. 13. The techniques can be used on one or more computers 1305A, 1305B. One or more methods (e.g., algorithms, processes) herein can be implemented with, or employed in computers and/or video display 1320, transmission, processing, and playback systems. The computers described herein may be any kind of computer, either general purpose, or some specific purpose computer such as a workstation. The computer 1305B may be, e.g., an Intel or AMD based computer, running Windows XP™, Vista™, or Linux, or may be a Macintosh™ computer. An embodiment may relate to a handheld computer, such as a PDA 1315, cell phone 1315, or laptop 1305A. The computer may also refer to machines or parts of a machine for image recording or reception 1325, 1330, 1335, processing, storage 1340, and distribution of data, in particular video data.

Any combination of the modules described herein may be part of a video system, (e.g., the parts of a video system as shown in FIGS. 1, 2, and 13). In some embodiments, any of the modules may be part of a video encoder, as in the example video encoder of FIG. 1. Any combination of the modules may be implemented in hardware and/or software. For example, any of the modules may be implemented with a computer program.

Computer and/or graphic programs may be written in C or Python, or Java, Brew or any other programming language. The programs may be resident on a storage medium, e.g., magnetic or optical, e.g., the computer hard drive, a removable disk or media such as a memory stick or SD media, wired or wireless network based or Bluetooth based or other Network Attached Storage (NAS), or other fixed or removable medium. The programs may also be run over a network 1350, for example, with a server or other machine sending communications to the local machine, which allows the local machine to carry out the operations described herein. The network may include a storage area network (SAN).

Although only a few embodiments have been described in detail above, other embodiments are possible. It should be appreciated that embodiments of the present invention may encompass equivalents and substitutes for one or more of the example techniques described herein. The present specification describes specific examples to accomplish a more general goal in another way. This description should be understood to represent example embodiments and the claims following are intended to cover any equivalent, modification or alternative.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a computer readable medium for execution by, or to control the operation of, data processing apparatus. The computer readable medium can be a machine-readable storage device 1340, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows and figures described and depicted in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or another programmable logic device (PLD) such as a microcontroller, or an ASIC (application specific integrated circuit).

Processors suitable for the execution of a computer program include, by way of example, both general and special purpose microprocessors, and any one or more processors of any kind of digital computer. Generally, a processor can receive instructions and data from a read only memory or a random access memory or both. The essential elements of a computer are a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. To provide for interaction with a user, some embodiments of the subject matter described in this specification can be implemented on a computer having a display device, e.g., a CRT (cathode ray tube), LCD (liquid crystal display), or plasma display monitor 1320, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an embodiment of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the aimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software or hardware product or packaged into multiple software or hardware products.

The term "algorithm" can refer to steps, methods, processes, schemes, procedures, operations, programs, guidelines, techniques, sequences, and/or a set of rules or instructions to achieve the results described herein. For example, an algorithm can be a set of video processing instructions for a hardware and/or software video processor. The disclosed algorithms can be related to video and can be generated, implemented, associated, and/or employed in video-related systems and/or any devices, machines, hardware, and/or articles of manufacture for the processing, compression, storage, transmission, reception, testing, calibration, display, and/or any improvement, in any combination, for video data.

The techniques and systems described herein can be further extended to the optimization in other multimedia applications, such as audio compression and processing. One or more embodiments of the various types of Lagrangian cost formulations presented in this disclosure can take into account various display, processing, and/or distortion characteristics. In some embodiments, the selection of one or more Lagrangian multipliers for one or more video displays can be partially or wholly decided based on the complexity, and/or channel of the modes and/or distortion metrics. As described herein, methods and systems can adaptively estimate and update Lagrangian multipliers in video compression. The methods and systems described here can be applied on different levels, including a block level, a macroblock level, a slice level, sequence or scene level, etc., or a combination of different levels. The proposed inventions can also be applied to adaptive video encoder control when then distortion is measured by one or more distortion metrics. The above estimation and update modules can be applied in an iterative manner, e.g., the updated Lagrangian multiplier can serve as an initial predictor in a second Lagrangian multiplier estimation module. Such a process can continue until the estimated Lagrangian multiplier converges or a pre-determined condition is met.

In some embodiments, one or more Lagrangian multipliers can be considered for one or more coding metrics. In other embodiments and/or combinations of some of the embodiments herein, there can be operations that are processed in parallel, in which the parallel-processed operations may involve multiple Lagrangian multipliers. Some of the parallel-processed operations may consider the slope(s) of the rate-distortion curve in multiple dimensions (e.g., in two or more dimensions).

Embodiments of the present invention may relate to one or more of the example embodiments enumerated below.

1. A method of encoding video, the method comprising:
    determining a first Lagrangian multiplier with a video encoder; and
    updating a second Lagrangian multiplier with the first Lagrangian multiplier.
2. The method of Enumerated Example Embodiment 1, wherein the first Lagrangian multiplier is determined at least partially based on a dependency with at least one other coding feature.
3. The method of Enumerated Example Embodiment 0, wherein the coding feature comprises a correlation of data samples, a temporal prediction, a spatial prediction, an inter prediction, an intra prediction, a plurality of distortions, or a characteristic of a picture, a region, or a frame, wherein the characteristic comprises texture and brightness.
4. The method of Enumerated Example Embodiment 0, wherein the video encoder comprises a Lagrangian Multiplier Estimation Module, and wherein the Lagrangian Multiplier Estimation Module comprises dynamic programming to generate the first Lagrangian multiplier, wherein the first Lagrangian multiplier comprises computing a rate distortion slope for at least one coding parameter of a rate distortion function.
5. The method of Enumerated Example Embodiment 0, wherein the coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.
6. The method of Enumerated Example Embodiment 0, wherein the method comprises, DCT-based video coding, wavelet-based video coding or bit-plane video coding.
7. The method of Enumerated Example Embodiment 0, wherein the first Lagrangian multiplier is generated at least partially based on one or more characteristics associated with a video display.
8. The method of Enumerated Example Embodiment 0, wherein the first Lagrangian multiplier is determined at least partially based on at least one video coding characteristic or video coding statistic, wherein the at least one video coding characteristic or video coding statistic comprises a measure of accuracy, complexity, efficiency, a coding performance, or local information or global information.
9. The method of Enumerated Example Embodiment 0, wherein determining the first Lagrangian multiplier comprises iteratively generating one or more intermediate Lagrangian multipliers to generate the first Lagrangian multiplier as a function of the at least one video coding characteristic or video coding statistic.
10. The method of Enumerated Example Embodiment 0, wherein determining the first Lagrangian multiplier comprises generating the first Lagrangian multiplier for any combination of different coding parameters for previously-coded macroblocks.
11. The method of Enumerated Example Embodiment, wherein the each of the different coding parameters comprises any of the following: one or more quantization parameters (QPs), one or more frame rates, one or more resolutions, or one or more coding layers, a function of one or more QPs, a function of one or more frame rates, a function of one or more resolutions, or a function of one or more coding layers.
12. The method of Enumerated Example Embodiment 0, wherein determining the first Lagrangian multiplier comprises generating an estimate of a slope of a rate distortion curve for at least one coding parameter, and wherein updating the second Lagrangian multiplier with the first Lagrangian multiplier comprises replacing the second Lagrangian multiplier with the estimate, wherein the coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.
13. The method of Enumerated Example Embodiment 0, further comprising:
    determining a third Lagrangian multiplier using a Lagrangian Multiplier Estimation Module of the video encoder; and
    updating the first Lagrangian multiplier with a replacement of the first Lagrangian multiplier with the third Lagrangian multiplier.
14. The method of Enumerated Example Embodiment 0, further comprising:
    computing other Lagrangian multipliers for a plurality of macroblocks or regions of macroblocks of a picture; and
    encoding a frame with the video encoder at least partially based on a function of all of the Lagrangian multipliers.
15. The method of Enumerated Example Embodiment 0, wherein determining the first Lagrangian multiplier comprises estimating the first Lagrangian multiplier for a distortion value and a rate value at a coding parameter using rate values and distortion values at coding parameters that neighbor the coding parameter.
16. The method of Enumerated Example Embodiment 0, wherein the coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.
17. The method of Enumerated Example Embodiment, wherein the rate and distortion values comprise a plurality of QP points, wherein the distortion and values for the plurality of QP points comprise $(D_{QP+l}, R_{QP+l})$, wherein $D_{QP+l}$ represents a distortion value at QP+L, wherein $R_{QP+l}$ represents a rate value at QP+L, wherein l, M, and N represent numbers of the QP points, wherein l comprises $-M, \ldots, -1, 1, \ldots N$, and wherein M and N are pre-selected or adaptively selected.
18. The method of Enumerated Example Embodiment, wherein the pre-selection is at least partially based on available computational resources, and wherein the adaptive selection is at least partially based on available computational resources or video sequence characteristics or regional characteristics, wherein the regional characteristics comprise characteristics of one or more macroblocks.

19. The method of Enumerated Example Embodiment, wherein for each QP point, the method further comprises:
   determining a mode where an overall Lagrangian cost function is minimized;
   determining corresponding rate and distortion values $(\tilde{D}_{QP+l}, \tilde{R}_{QP+l})$ for the mode, wherein $\tilde{D}_{QP+l}$ represents a distortion value at QP+l, and wherein $\tilde{R}_{QP+l}$ represents a rate value at QP+l; and
   when the rate and distorting values $(\tilde{D}_{QP+l}, \tilde{R}_{QP+l})$ are determined for the $-M, \ldots, -1, 1, \ldots N$, estimating a slope of a curve at $(D_{QP}, R_{QP})$ using a first order derivative estimation method, wherein $D_{QP}$ represents a distortion value at QP, and wherein $R_{QP}$ represents a rate value at the QP.

20. The method of Enumerated Example Embodiment, wherein the first order derivative estimation method comprises a geometric average of a finite difference at the $(D_{QP}, R_{QP})$.

21. The method of Enumerated Example Embodiment, wherein the first Lagrangian multiplier that is estimated comprises $\lambda_{estimate}$, wherein $$\lambda_{estimate} = \left( \prod_{l=-M, l \neq 0}^{N} \hat{\lambda}_l \right)^{\frac{1}{M+N}},$$

wherein $\hat{\lambda}_l$ comprises a ratio for the l of a difference of distortions and a difference of rates, wherein $$\hat{\lambda}_l = \frac{\tilde{D}_{QP+l} - D_{QP}}{\tilde{R}_{QP+l} - R_{QP}}, l = -M, \ldots, -1, 1, \ldots, N,$$

and wherein $$\prod_{l=-M, l \neq 0}^{N}$$

represents a mode for the l.

22. The method of Enumerated Example Embodiment, wherein the first Lagrangian multiplier that is estimated comprises comparing a plurality of Lagrangian costs for one or more candidate modes to determine the distortion and rate values.

23. The method of Enumerated Example Embodiment, wherein for each QP point, the method further comprises searching for a mode where an overall Lagrangian cost function is minimized.

24. The method of Enumerated Example Embodiment 0, wherein determining the first Lagrangian multiplier comprises performing rate distortion slope estimation with local approximation 1

25. The method of Enumerated Example Embodiment, wherein performing rate distortion slope estimation with local approximation comprises:
   determining a mode $\pi^*$ where an overall Lagrangian cost function is minimized for a current coding parameter with a current Lagrangian multiplier $\lambda_{current}$;
   determining distortion and rate values $(\tilde{D}_{QP+l}, \tilde{R}_{QP+l})$ for l, wherein the l comprises $-M, \ldots, -1, 1, \ldots N$, wherein l, M, and N represent numbers for a plurality of QP points, wherein $\tilde{D}_{QP+l}$ represents a distortion value at QP+l, and wherein $\tilde{R}_{QP+l}$ represents a rate value at QP+l; and
   estimating a slope of a curve at $(D_{QP}, R_{QP})$ using a first order derivative estimation method, wherein $D_{QP}$ represents a distortion value at QP, and wherein $R_{QP}$ represents a rate value at QP, wherein the coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

26. The method of Enumerated Example Embodiment, wherein the first order derivative estimation method comprises a geometric average of a finite difference at the $(D_{QP}, R_{QP})$.

27. The method of Enumerated Example Embodiment, wherein the first Lagrangian multiplier that is estimated comprises $\lambda_{estimate}$, wherein $$\lambda_{estimate} = \left( \prod_{l=-M, l \neq 0}^{N} \hat{\lambda}_l \right)^{\frac{1}{M+N}},$$

wherein $\hat{\lambda}_l$ comprises a ratio for the l of a difference of distortions and a difference of rates, wherein $$\hat{\lambda}_l = \frac{\tilde{D}_{QP+l} - D_{QP}}{\tilde{R}_{QP+l} - R_{QP}}, l = -M, \ldots, -1, 1, \ldots, N,$$

and wherein $$\prod_{l=-M, l \neq 0}^{N}$$

represents a mode for the l.

28. The method of Enumerated Example Embodiment, wherein determining the distortion and rate values $(\tilde{D}_{QP+l}, \tilde{R}_{QP+l})$ comprises:
   setting the distortion value $\tilde{D}_{QP+l}$ as a function of the mode $\pi^*$, a number i for a plurality of QP points, and the quantization parameter QP+l, wherein the distortion value $\tilde{D}_{QP+l}$ is $\tilde{D}_{QP+l} = d(i, \pi^*, QP+l)$;
   setting the rate value $\tilde{R}_{QP+l}$ as a function of the mode $\pi^*$, the number i for the plurality of QP points, and the quantization parameter QP+l, wherein the rate value $\tilde{R}_{QP+l}$ is $\tilde{R}_{QP+l} = d(i, \pi^*, QP+l)$; and
   computing $\hat{\lambda}_l$, wherein $\hat{\lambda}_l$ comprises a ratio for the l of a difference of distortions and a difference of rates, wherein the computing of $\hat{\lambda}_l$ comprises $$\hat{\lambda}_l = \frac{\tilde{D}_{QP+l} - D_{QP}}{\tilde{R}_{QP+l} - R_{QP}}, l = -M, \ldots, -1, 1, \ldots, N.$$

29. The method of Enumerated Example Embodiment 0, wherein determining the first Lagrangian multiplier comprises using local information to estimate the first Lagrangian multiplier.
30. The method of Enumerated Example Embodiment, wherein the local information comprises a variance, a luma component, a mean of luma component, a chroma component, a motion intensity, texture or edge information, or a characteristic or a Lagrangian multiplier of spatially or temporally neighboring areas of a region or macroblock, wherein a coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.
31. The method of Enumerated Example Embodiment, wherein the first Lagrangian multiplier comprises $\lambda_{estimate}$, and determining the first Lagrangian multiplier comprises calculating $\lambda_{estimate}$, wherein $\lambda_{estimate}$ is a function of a local estimation method $f_{local}(\cdot)$ for local information $I_{local}$, wherein $\lambda_{estimate} = f_{local}(I_{local})$.
32. The method of Enumerated Example Embodiment, further comprising:
    for a macroblock associated with the first Lagrangian multiplier, computing the local information; and
    determining the first Lagrangian multiplier at least partially based on the computed local information and the coding parameter.
33. The method of Enumerated Example Embodiment, wherein the first Lagrangian multiplier is determined from a Lagrangian multiplier look-up table.
34. The method of Enumerated Example Embodiment, wherein determining the first Lagrangian multiplier comprises generating a Lagrangian multiplier look-up table, the generation of the Lagrangian multiplier look-up table comprises:
    computing a plurality of variances for an area;
    estimating a plurality of Lagrangian multipliers for a plurality of quantization parameters (QPs);
    arranging the plurality of variances into (K+1) groups with K bins;
    arranging the plurality of QPs into groups with L bins;
    computing an average Lagrangian multiplier for each of the groups at least partially based on the K and L bins; and
    recording the average Lagrangian multipliers within the Lagrangian multiplier look-up table.
35. The method of Enumerated Example Embodiment, further comprising adaptively or periodically updating the Lagrangian multiplier look-up table for two or more areas, slices, or scenes.
36. The method of Enumerated Example Embodiment 0, further comprising using global information to estimate the first Lagrangian multiplier, wherein a coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.
37. The method of Enumerated Example Embodiment, wherein the global information comprises a frame rate, a spatial characteristic, a luma or chroma variance, a DC value, a histogram of a DC value, a current coding structure, metadata information, or a hierarchy level within a current Group of Pictures (GOP).
38. The method of Enumerated Example Embodiment, wherein the first Lagrangian multiplier comprises $\lambda_{estimate}$, and determining the first Lagrangian multiplier comprises calculating $\lambda_{estimate}$, wherein $\lambda_{estimate}$ is a function of a global estimation method $f_{global}(\cdot)$ for global information $I_{global}$, wherein $\lambda_{estimate} = f_{global}(I_{global})$.
39. The method of Enumerated Example Embodiment, wherein the first Lagrangian multiplier further comprises:
    computing the global information; and
    determining the first Lagrangian multiplier at least partially based on the computed global information and a coding parameter.
40. The method of Enumerated Example Embodiment, wherein determining the first Lagrangian multiplier at least partially based on the computed global information and the coding parameter comprises adjusting the first Lagrangian multiplier at least partially based on temporal characteristics, sequences, or coding differences between pictures or regions.
41. The method of Enumerated Example Embodiment, wherein determining the first Lagrangian multiplier comprises a function of the coding parameter and a hierarchical level of pictures, wherein the first Lagrangian multiplier is $\lambda_k$.
42. The method of Enumerated Example Embodiment, wherein determining the first Lagrangian multiplier further comprises:
    setting the first Lagrangian multiplier $\lambda_k$ as a function of the hierarchical level, a step size of a change between pictures for a Group of Pictures (GOP), and an anchor picture for the GOP, wherein k represents the hierarchical level, $\Delta_{GOP}$ represents the step size of a change between pictures for the GOP, and $\lambda_{anchor}$ represents the anchor picture for the GOP, wherein $\lambda_k = (1 - k \cdot \Delta_{GOP}) \cdot \lambda_{anchor}$; and
    computing the first Lagrangian multiplier.
43. The method of Enumerated Example Embodiment, wherein determining the first Lagrangian multiplier further comprises:
    setting the first Lagrangian multiplier $\lambda_k$ as a function of the Lagrangian multiplier of an anchor picture and a ratio of a distance of the anchor picture and a distance in the GOP, wherein k represents the hierarchical level, $\lambda_{anchor}$ represents the Lagrangian multiplier of anchor picture for the GOP, and $d_{anchor}$ represents the distance of the anchor picture; and $d_{GOP}$ represents the distance in the GOP, wherein $$\lambda_k = \frac{d_{anchor}}{d_{GOP}} \cdot \lambda_{anchor};$$

and
    computing the first Lagrangian multiplier.
44. The method of Enumerated Example Embodiment, wherein deteiinining the first Lagrangian multiplier further comprises determining a Lagrangian multiplier for one or more pictures for a Group of Pictures (GOP) at least partially based on a distance to an anchor picture.
45. The method of Enumerated Example Embodiment, wherein the first Lagrangian multiplier is determined from a Lagrangian multiplier look-up table.

46. The method of Enumerated Example Embodiment, wherein the Lagrangian multiplier look-up table is at least partially based on a plurality of coding parameters.
47. The method of Enumerated Example Embodiment, further comprising updating the first Lagrangian multiplier at least partially based on a plurality of Lagrangian multipliers in the Lagrangian multiplier look-up table.
48. The method of Enumerated Example Embodiment, wherein determining the first Lagrangian multiplier further comprises a function of translating a previous hierarchical structure for a Group of Pictures (GOP) with a subsequent hierarchical structure for the GOP.
49. The method of Enumerated Example Embodiment 0, wherein updating the second Lagrangian multiplier with the first Lagrangian multiplier comprises:
   estimating the first Lagrangian multiplier with a Lagrangian Multiplier Estimation Module of the video encoder; and
   replacing the second Lagrangian multiplier with the first Lagrangian multiplier.
50. The method of Enumerated Example Embodiment 0, wherein updating the second Lagrangian multiplier comprises changing the second Lagrangian multiplier in a series of Lagrangian steps to change the second Lagrangian multiplier to the first Lagrangian multiplier at an end of the series.
51. The method of Enumerated Example Embodiment, wherein updating the second Lagrangian multiplier comprises computing an updated second Lagrangian multiplier $\lambda_{new}$ that is a function of the first Lagrangian multiplier $\lambda_{estimate}$ and the second Lagrangian multiplier $\lambda_{current}$, wherein $\lambda_{new}=\lambda_{current}+\Delta \cdot (\lambda_{estimate}-\lambda_{current})$, and wherein the $\Delta$ comprises a value that is preset or adaptively changed, and wherein $0<\Delta<1$.
52. The method of Enumerated Example Embodiment, wherein updating the second Lagrangian multiplier comprises placing a limit on a size of an update of the second Lagrangian multiplier by setting an upper bound or a lower bound on updates to the second Lagrangian multiplier.
53. The method of Enumerated Example Embodiment 0, wherein updating the second Lagrangian multiplier comprises:
   computing a sliding window average of a plurality of Lagrangian multipliers in one or more previous macroblocks and a current macroblock.
54. The method of Enumerated Example Embodiment, the method further comprising:
   for the plurality of Lagrangian multipliers, selecting a subset of the Lagrangian multipliers for a sliding window of Lagrangian multipliers; and
   updating the second Lagrangian multiplier as a function of an average of the sliding window.
55. The method of Enumerated Example Embodiment 0, wherein updating the second Lagrangian multiplier with the first Lagrangian multiplier comprises updating the second Lagrangian multiplier periodically, wherein a period of the update comprises a fixed period or an adaptively-changing period.
56. The method of Enumerated Example Embodiment, wherein the period depends on a local context, wherein the local context comprises motion intensity or scene cut information.
57. The method of Enumerated Example Embodiment, wherein the second Lagrangian multiplier is updated at a start of a slice.
58. The method of Enumerated Example Embodiment, wherein the second Lagrangian multiplier is updated when a scene cut is detected.
59. The method of Enumerated Example Embodiment, wherein updating the second Lagrangian multiplier comprises:
   computing a variance of at least two macroblocks with the video encoder; and
   updating the second Lagrangian multiplier if a change of the variance between two adjacent macroblocks exceeds a threshold value.
60. The method of Enumerated Example Embodiment, wherein updating the second Lagrangian multiplier comprises updating the second Lagrangian multiplier for a number of periods, pictures, or regions of a picture.
61. The method of Enumerated Example Embodiment, wherein updating the second Lagrangian multiplier comprises executing different types of updates of the second Lagrangian multiplier in a random order or a fixed order, wherein the different types of updates comprise a direct update, a step size update, and a sliding widow update.
62. The method of Enumerated Example Embodiment 0, wherein the updating the second Lagrangian multiplier with the first Lagrangian multiplier comprises using a Lagrangian Multiplier Update Module of the video encoder; and the method further comprises coding a region of the video using the second Lagrangian multiplier.
63. The method of Enumerated Example Embodiment 0, wherein the determining the first Lagrangian multiplier comprises computing a plurality of distortion metrics.
64. The method of Enumerated Example Embodiment 0, further comprising:
   determining a first group of Lagrangian multipliers with the video encoder; and
   updating a second group of Lagrangian multipliers with the first group of Lagrangian multipliers.
65. The method of Enumerated Example Embodiment, wherein a plurality of distortion constraints are employed in determining the first group of Lagrangian multipliers.
66. The method of Enumerated Example Embodiment, wherein determining the first group of Lagrangian multipliers comprises computing a rate distortion slope with two or more dimensions and one or more coding parameters, wherein the one or more coding parameters comprise any combination of the following: one or more quantization parameters (QPs), one or more frame rates, one or more resolutions, one or more coding layers, a function of one or more QPs, a function of one or more frame rates, a function of one or more resolutions, or a function of one or more coding layers.
67. A computer program product, tangibly encoded on a computer-readable medium, comprising instructions to cause data processing apparatus to perform video coding operations, the operations comprising:
   determining a first Lagrangian multiplier with a video encoder; and
   updating a second Lagrangian multiplier with the first Lagrangian multiplier.
68. The computer program product of Enumerated Example Embodiment, further comprising instructions for determining the first Lagrangian multiplier at least partially based on a dependency with at least one other coding feature.
69. The computer program product of Enumerated Example Embodiment, wherein the coding feature comprises a correlation of data samples, a temporal prediction, a spatial prediction, an inter prediction, an intra prediction, a plurality of distortions, or a characteristic of a picture, a region, or a frame, wherein the characteristic comprises texture and brightness.

70. The computer program product of Enumerated Example Embodiment, wherein the video encoder comprises a Lagrangian Multiplier Estimation Module, and wherein the Lagrangian Multiplier Estimation Module comprises dynamic programming to generate the first Lagrangian multiplier, wherein the first Lagrangian multiplier comprises computing a rate distortion slope for at least one coding parameter of a rate distortion function.

71. The computer program product of Enumerated Example Embodiment, wherein the coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

72. The computer program product of Enumerated Example Embodiment, further comprising instructions for DCT-based video coding, wavelet-based video coding operations or bit-plane video coding operations.

73. The computer program product of Enumerated Example Embodiment, wherein the first Lagrangian multiplier is generated with instructions that are at least partially based on one or more characteristics associated with a video display.

74. The computer program product of Enumerated Example Embodiment, further comprising instructions for determining the first Lagrangian multiplier at least partially based on at least one video coding characteristic or video coding statistic, wherein the at least one video coding characteristic or video coding statistic comprises a measure of accuracy, complexity, efficiency, a coding performance, or local information or global information.

75. The computer program product of Enumerated Example Embodiment, wherein the instructions for determining the first Lagrangian multiplier comprises iteratively generating one or more intermediate Lagrangian multipliers to generate the first Lagrangian multiplier as a function of the at least one video coding characteristic or video coding statistic.

76. The computer program product of Enumerated Example Embodiment, wherein the instructions for determining the first Lagrangian multiplier comprises generating the first Lagrangian multiplier for any combination of different coding parameters for previously-coded macroblocks.

77. The computer program product of Enumerated Example Embodiment, wherein the each of the different coding parameters comprises any of the following: one or more quantization parameters (QPs), one or more frame rates, one or more resolutions, or one or more coding layers, a function of one or more QPs, a function of one or more frame rates, a function of one or more resolutions, or a function of one or more coding layers.

78. The computer program product of Enumerated Example Embodiment, wherein determining the first Lagrangian multiplier comprises generating an estimate of a slope of a rate distortion curve for at least one coding parameter, and wherein updating the second Lagrangian multiplier with the first Lagrangian multiplier comprises replacing the second Lagrangian multiplier with the estimate, wherein the coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

79. The computer program product of Enumerated Example Embodiment, further comprising instructions for:
    determining a third Lagrangian multiplier using a Lagrangian Multiplier Estimation Module of the video encoder; and
    updating the first Lagrangian multiplier with a replacement of the first Lagrangian multiplier with the third Lagrangian multiplier.

80. The computer program product of Enumerated Example Embodiment, further comprising instructions for:
    computing other Lagrangian multipliers for a plurality of macroblocks or regions of macroblocks of a picture; and
    encoding a frame with the video encoder at least partially based on a function of all of the Lagrangian multipliers.

81. The computer program product of Enumerated Example Embodiment, wherein the instructions for determining the first Lagrangian multiplier comprises estimating the first Lagrangian multiplier for a distortion value and a rate value at a coding parameter using rate values and distortion values at coding parameters that neighbor the coding parameter.

82. The computer program product of Enumerated Example Embodiment, wherein the coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

83. The computer program product of Enumerated Example Embodiment, wherein the rate and distortion values comprise a plurality of QP points, wherein the distortion and values for the plurality of QP points comprise $(D_{QP+l}, R_{QP+l})$, wherein $D_{QP+l}$ represents a distortion value at QP+l, wherein $R_{QP+l}$ represents a rate value at QP+l, wherein l, M, and N represent numbers of the QP points, wherein l comprises $-M, \ldots, -1, 1, \ldots N$, and wherein M and N are pre-selected or adaptively selected in one or more operations.

84. The computer program product of Enumerated Example Embodiment, further comprising instructions for the pre-selection to be at least partially based on available computational resources; and further comprising instructions for the adaptive selection to be at least partially based on available computational resources or video sequence characteristics or regional characteristics, wherein the regional characteristics comprise characteristics of one or more macroblocks.

85. The computer program product of Enumerated Example Embodiment, wherein for each QP point, further comprising instructions to the cause data processing apparatus to perform video coding operations comprising:
    determining a mode where an overall Lagrangian cost function is minimized;
    determining corresponding rate and distortion values $(\tilde{D}_{QP+l}, \tilde{R}_{QP+l})$ for the mode, wherein $\tilde{D}_{QP+l}$ represents a distortion value at QP+l, and wherein $\tilde{R}_{QP+l}$ represents a rate value at QP+l; and
    when the rate and distortion values $(\tilde{D}_{QP+l}, \tilde{R}_{QP+l})$ are determined for the $-M, \ldots, -1, 1, \ldots N$, estimating a slope of a curve at $(D_{QP}, R_{QP})$ using a first order derivative estimation method, wherein $D_{QP}$ represents a distortion value at QP, and wherein $R_{QP}$ represents a rate value at the QP.

86. The computer program product of Enumerated Example Embodiment, wherein the first order derivative estimation method comprises a geometric average of a finite difference at the $(D_{QP}, R_{QP})$.

87. The computer program product of Enumerated Example Embodiment, wherein the first Lagrangian multiplier that is estimated comprises $\lambda_{estimate}$, wherein $$\lambda_{estimate} = \left( \prod_{l=-M, l \neq 0}^{N} \hat{\lambda}_l \right)^{\frac{1}{M+N}},$$

wherein $\hat{\lambda}_l$ comprises a ratio for the l including a difference of distortions and a difference of rates, wherein $$\hat{\lambda}_l = \frac{\tilde{D}_{QP+l} - D_{QP}}{\tilde{R}_{QP+l} - R_{QP}}, l = -M, \ldots, -1, 1, \ldots, N,$$

and wherein $$\prod_{l=-M, l \neq 0}^{N}$$

represents a mode for the l.

88. The computer program product of Enumerated Example Embodiment, wherein the first Lagrangian multiplier that is estimated comprises a comparison of a plurality of Lagrangian costs for one or more candidate modes to determine the distortion and rate values.

89. The computer program product of Enumerated Example Embodiment, wherein for each QP point, further comprising instructions for searching for a mode where an overall Lagrangian cost function is minimized.

90. The computer program product of Enumerated Example Embodiment, wherein instructions for determining the first Lagrangian multiplier comprises performing rate distortion slope estimation with local approximation.

91. The computer program product of Enumerated Example Embodiment, wherein instructions for performing rate distortion slope estimation with local approximation comprises:
determining a mode $\pi^*$ where an overall Lagrangian cost function is minimized for a current coding parameter with a current Lagrangian multiplier $\lambda_{current}$;
determining distortion and rate values $(\tilde{D}_{QP+l}, \tilde{R}_{QP+l})$ for l, wherein the l comprises $-M, \ldots, -1, 1, \ldots N$, wherein l, M, and N represent numbers for a plurality of QP points, wherein $\tilde{D}_{QP+l}$ represents a distortion value at QP+l, and wherein $\tilde{R}_{QP+l}$ represents a rate value at QP+l; and
estimating a slope of a curve at $(D_{QP}, R_{QP})$ using instructions for a first order derivative estimation method, wherein $D_{QP}$ represents a distortion value at QP, and wherein $R_{QP}$ represents a rate value at QP, wherein the coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

92. The computer program product of Enumerated Example Embodiment, wherein the instructions for first order derivative estimation method comprises computing a geometric average of a finite difference at the $(D_{QP}, R_{QP})$.

93. The computer program product of Enumerated Example Embodiment, wherein the first Lagrangian multiplier that is estimated comprises $\lambda_{estimate}$, wherein $$\lambda_{estimate} = \left( \prod_{l=-M, l \neq 0}^{N} \hat{\lambda}_l \right)^{\frac{1}{M+N}},$$

wherein $\hat{\lambda}_l$ comprises a ratio for the l of a difference of distortions and a difference of rates, wherein $$\hat{\lambda}_l = \frac{\tilde{D}_{QP+l} - D_{QP}}{\tilde{R}_{QP+l} - R_{QP}}, l = -M, \ldots, -1, 1, \ldots, N,$$

and wherein $$\prod_{l=-M, l \neq 0}^{N}$$

represents a mode for the l.

94. The computer program product of Enumerated Example Embodiment, wherein instructions for determining the distortion and rate values $(\tilde{D}_{QP+l}, \tilde{R}_{QP+l})$ comprises:
setting the distortion value $\tilde{R}_{QP+l}$ as a function of the mode $\pi^*$, a number i for a plurality of QP points, and the quantization parameter QP+l, wherein the distortion value $\tilde{R}_{QP+l}$ comprises $\tilde{R}_{QP+l} = d(i, \pi^*, QP+l)$;
setting the rate value $\tilde{R}_{QP+l}$ as a function of the mode $\pi^*$, the number i for the plurality of QP points, and the quantization parameter QP+l, wherein the rate value $\tilde{R}_{QP+l}$ comprises $\tilde{R}_{QP+l} = d(i, \pi^*, QP+l)$; and
computing $\hat{\lambda}_l$, wherein $\hat{\lambda}_l$ comprises a ratio for the l of a difference of distortions and a difference of rates, wherein the computing of $\hat{\lambda}_l$ comprises $$\hat{\lambda}_l = \frac{\tilde{D}_{QP+l} - D_{QP}}{\tilde{R}_{QP+l} - R_{QP}}, l = -M, \ldots, -1, 1, \ldots, N.$$

95. The computer program product of Enumerated Example Embodiment, further comprising instructions for using local information to estimate the first Lagrangian multiplier.

96. The computer program product of Enumerated Example Embodiment, wherein the local information comprises a variance, a luma component, a mean of luma component, a chroma component, a motion intensity, texture or edge information, or a characteristic or a Lagrangian multiplier of spatially or temporally neighboring areas of a region or macroblock, wherein a coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

97. The computer program product of Enumerated Example Embodiment, wherein the first Lagrangian multiplier comprises $\lambda_{estimate}$, and determining the first Lagrangian multiplier comprises instruction for calculating $\lambda_{estimate}$, wherein $\lambda_{estimate}$ is a function of a local estimation method $f_{local}(\cdot)$ for local information $I_{local}$, wherein $\lambda_{estimate} = f_{local}(I_{local})$.

98. The computer program product of Enumerated Example Embodiment, the instructions further comprising:
for a macroblock associated with the first Lagrangian multiplier, computing the local information; and
determining the first Lagrangian multiplier at least partially based on the computed local information and the coding parameter.

99. The computer program product of Enumerated Example Embodiment, wherein the first Lagrangian multiplier is determined from a Lagrangian multiplier look-up table.

100. The computer program product of Enumerated Example Embodiment, wherein instructions for determining the first Lagrangian multiplier comprises generating a Lagrangian multiplier look-up table, the generation of the Lagrangian multiplier look-up table comprises:
computing a plurality of variances for an area;
estimating a plurality of Lagrangian multipliers for a plurality of quantization parameters (QPs);
arranging the plurality of variances into (K+1) groups with K bins;
arranging the plurality of QPs into groups with L bins;
computing an average Lagrangian multiplier for each of the groups at least partially based on the K and L bins; and
recording the average Lagrangian multipliers within the Lagrangian multiplier look-up table.

101. The computer program product of Enumerated Example Embodiment, further comprising instructions for adaptively or periodically updating the Lagrangian multiplier look-up table for two or more areas, slices, or scenes.

102. The computer program product of Enumerated Example Embodiment, further comprising using global information to estimate the first Lagrangian multiplier, wherein a coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

103. The computer program product of Enumerated Example Embodiment, wherein the global information comprises a frame rate, a spatial characteristic, a luma or chroma variance, a DC value, a histogram of a DC value, a current coding structure, metadata infoiation, or a hierarchy level within a current Group of Pictures (GOP).

104. The computer program product of Enumerated Example Embodiment, wherein the first Lagrangian multiplier comprises $\lambda_{estimate}$, and the instructions for determining the first Lagrangian multiplier comprises calculating $\lambda_{estimate}$, wherein $\lambda_{estimate}$ is a function of a global estimation method $f_{global}(\cdot)$ for global information $I_{global}$, wherein $\lambda_{estimate} = f_{global}(I_{global})$.

105. The computer program product of Enumerated Example Embodiment, wherein the instructions associated with the first Lagrangian multiplier further comprises:
computing the global information; and
determining the first Lagrangian multiplier at least partially based on the computed global information and a coding parameter.

106. The computer program product of Enumerated Example Embodiment, wherein determining the first Lagrangian multiplier at least partially based on the computed global information and the coding parameter comprises instructions for adjusting the first Lagrangian multiplier at least partially based on temporal characteristics, sequences, or coding differences between pictures or regions.

107. The computer program product of Enumerated Example Embodiment, wherein instructions for determining the first Lagrangian multiplier comprises a function of the coding parameter and a hierarchical level of pictures, wherein the first Lagrangian multiplier is $\lambda_k$.

108. The computer program product of Enumerated Example Embodiment, wherein determining the first Lagrangian multiplier further comprises:
setting the first Lagrangian multiplier $\lambda_k$ as a function of the hierarchical level, a step size of a change between pictures for a Group of Pictures (GOP), and an anchor picture for the GOP, wherein k represents the hierarchical level, $\Delta_{GOP}$ represents the step size of a change between pictures for the GOP, and $\lambda_{anchor}$ represents the anchor picture for the GOP, wherein $\lambda_k = (1 - k \cdot \Delta_{GOP}) \cdot \lambda_{anchor}$; and
computing the first Lagrangian multiplier.

109. The computer program product of Enumerated Example Embodiment, wherein instructions for determining the first Lagrangian multiplier further comprises:
setting the first Lagrangian multiplier $\lambda_k$ as a function of the Lagrangian multiplier of an anchor picture and a ratio of a distance of the anchor picture and a distance in the GOP, wherein k represents the hierarchical level, $\lambda_{anchor}$ represents the Lagrangian multiplier of anchor picture for the GOP, and $d_{anchor}$ represents the distance of the anchor picture; and $d_{GOP}$ represents the distance in the GOP, wherein $$\lambda_k = \frac{d_{anchor}}{d_{GOP}} \cdot \lambda_{anchor};$$

and
computing the first Lagrangian multiplier.

110. The computer program product of Enumerated Example Embodiment, wherein the instructions for determining the first Lagrangian multiplier further comprises instructions for determining a Lagrangian multiplier for one or more pictures for a Group of Pictures (GOP) at least partially based on a distance to an anchor picture.

111. The computer program product of Enumerated Example Embodiment, wherein the first Lagrangian multiplier is determined from a Lagrangian multiplier look-up table.

112. The computer program product of Enumerated Example Embodiment 1, wherein the Lagrangian multiplier look-up table is at least partially based on a plurality of coding parameters.

113. The computer program product of Enumerated Example Embodiment 1, further comprising instructions for updating the first Lagrangian multiplier at least partially based on a plurality of Lagrangian multipliers in the Lagrangian multiplier look-up table.

114. The computer program product of Enumerated Example Embodiment 1, wherein the instructions for determining the first Lagrangian multiplier further comprises a function of translating a previous hierarchical structure for a Group of Pictures (GOP) with a subsequent hierarchical structure for the GOP.

115. The computer program product of Enumerated Example Embodiment 1, wherein instructions for updating the second Lagrangian multiplier with the first Lagrangian multiplier comprises:
estimating the first Lagrangian multiplier with a Lagrangian Multiplier Estimation Module of the video encoder; and
replacing the second Lagrangian multiplier with the first Lagrangian multiplier.

116. The computer program product of Enumerated Example Embodiment 1, wherein the instructions for updating the second Lagrangian multiplier comprises instructions for changing the second Lagrangian multiplier in a series of Lagrangian steps to change the second Lagrangian multiplier to the first Lagrangian multiplier at an end of the series.

117. The computer program product of Enumerated Example Embodiment 1, wherein the instructions for updating the second Lagrangian multiplier comprises instructions for computing an updated second Lagrangian multiplier $\lambda_{new}$ that is a function of the first Lagrangian multiplier $\lambda_{estimate}$ and the second Lagrangian multiplier $\lambda_{current}$, wherein $\lambda_{new} = \lambda_{current} + \Delta \cdot (\lambda_{estimate} - \lambda_{current})$, and wherein the $\Delta$ comprises a value that is preset or adaptively changed, and wherein $0 < \Delta < 1$.

118. The computer program product of Enumerated Example Embodiment 1, wherein the instructions for updating the second Lagrangian multiplier comprises instructions for placing a limit on a size of an update of the second Lagrangian multiplier by setting an upper bound or a lower bound on updates to the second Lagrangian multiplier.

119. The computer program product of Enumerated Example Embodiment 1, wherein the instructions for updating the second Lagrangian multiplier comprises:
computing a sliding window average of a plurality of Lagrangian multipliers in one or more previous macroblocks and a current macroblock.

120. The computer program product of Enumerated Example Embodiment 1, the instructions further comprising video coding operations comprising:
for the plurality of Lagrangian multipliers, selecting a subset of the Lagrangian multipliers for a sliding window of Lagrangian multipliers; and
updating the second Lagrangian multiplier as a function of an average of the sliding window.

121. The computer program product of Enumerated Example Embodiment 1, wherein the instructions for updating the second Lagrangian multiplier with the first Lagrangian multiplier comprises instructions for updating the second Lagrangian multiplier periodically, wherein a period of the update comprises a fixed period or an adaptively-changing period.

122. The computer program product of Enumerated Example Embodiment 1, wherein the period is dependent on a local context, wherein the local context comprises motion intensity or scene cut information.

123. The computer program product of Enumerated Example Embodiment 1, further comprising instructions for updating the second Lagrangian multiplier at a start of a slice.

124. The computer program product of Enumerated Example Embodiment 1, further comprising instructions for updating the second Lagrangian multiplier when a scene cut is detected.

125. The computer program product of Enumerated Example Embodiment 1, wherein the instructions for updating the second Lagrangian multiplier comprises:
computing a variance of at least two macroblocks with the video encoder; and
updating the second Lagrangian multiplier if a change of the variance between two adjacent macroblocks exceeds a threshold value.

126. The computer program product of Enumerated Example Embodiment 1, wherein the instructions for updating the second Lagrangian multiplier comprises instructions for updating the second Lagrangian multiplier for a number of periods, pictures, or regions of a picture.

127. The computer program product of Enumerated Example Embodiment 1, wherein the instructions for updating the second Lagrangian multiplier comprises executing different types of updates of the second Lagrangian multiplier in a random order or a fixed order, wherein the different types of updates comprise a direct update, a step size update, and a sliding widow update.

128. The computer program product of Enumerated Example Embodiment 1, wherein the instructions for updating the second Lagrangian multiplier with the first Lagrangian multiplier comprises using a Lagrangian Multiplier Update Module of the video encoder; and the instructions further comprise coding a region of the video using the second Lagrangian multiplier.

129. The computer program product of Enumerated Example Embodiment 1, wherein the instructions for determining the first Lagrangian multiplier comprises computing a plurality of distortion and/or complexity metrics.

130. The computer program product of Enumerated Example Embodiment 1, the instructions further comprising:
determining a first group of Lagrangian multipliers with the video encoder; and
updating a second group of Lagrangian multipliers with the first group of Lagrangian multipliers.

131. The computer program product of Enumerated Example Embodiment 1, further comprising instructions for utilizing a plurality of distortion constraints in determining the first group of Lagrangian multipliers.

132. The computer program product of Enumerated Example Embodiment 1, wherein determining the first group of Lagrangian multipliers comprises computing a rate distortion slope with two or more dimensions and one or more coding parameters, wherein the one or more coding parameters comprise any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

133. A system for encoding video, the system comprising one or more components configured to process video coding operations comprising:
determining a first Lagrangian multiplier with the one or more components, the one or more components comprising a video encoder; and
updating a second Lagrangian multiplier with the first Lagrangian multiplier.

134. The system of Enumerated Example Embodiment 1, wherein the first Lagrangian multiplier is determined at least partially based on a dependency with at least one other coding feature.

135. The system of Enumerated Example Embodiment 1, wherein the coding feature comprises a correlation of data samples, a temporal prediction, a spatial prediction, an inter prediction, an intra prediction, a plurality of distortions, or a characteristic of a picture, a region, or a frame, wherein the characteristic comprises texture and brightness.

136. The system of Enumerated Example Embodiment 1, wherein the video encoder comprises a Lagrangian Multiplier Estimation Module, and wherein the Lagrangian Multiplier Estimation Module comprises dynamic programming to generate the first Lagrangian multiplier, wherein the first Lagrangian multiplier comprises computing a rate distortion slope for at least one coding parameter of a rate distortion function.

137. The system of Enumerated Example Embodiment 1, wherein the coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

138. The system of Enumerated Example Embodiment 1, wherein the system is operable to handle instructions for DCT-based video coding, wavelet-based video coding or bit-plane video coding.

139. The system of Enumerated Example Embodiment 1, wherein the first Lagrangian multiplier is generated at least partially based on one or more characteristics associated with at least one video display.

140. The system of Enumerated Example Embodiment 1, wherein the one or more components determine the first Lagrangian multiplier at least partially based on at least one video coding characteristic or video coding statistic, wherein the at least one video coding characteristic or video coding statistic comprises a measure of accuracy, complexity, efficiency, a coding performance, or local information or global information.

141. The system of Enumerated Example Embodiment 1, wherein the one or more components determining the first Lagrangian multiplier comprises iteratively generating one or more intermediate Lagrangian multipliers to generate the first Lagrangian multiplier as a function of the at least one video coding characteristic or video coding statistic.

142. The system of Enumerated Example Embodiment 1, wherein determining the first Lagrangian multiplier comprises generating the first Lagrangian multiplier for any combination of different coding parameters for previously-coded macroblocks.

143. The system of Enumerated Example Embodiment 1, wherein the each of the different coding parameters comprises any of the following: one or more quantization parameters (QPs), one or more frame rates, one or more resolutions, or one or more coding layers, a function of one or more QPs, a function of one or more frame rates, a function of one or more resolutions, or a function of one or more coding layers.

144. The system of Enumerated Example Embodiment 1, wherein determining the first Lagrangian multiplier comprises generating an estimate of a slope of a rate distortion curve for at least one coding parameter, and wherein updating the second Lagrangian multiplier with the first Lagrangian multiplier comprises replacing the second Lagrangian multiplier with the estimate, wherein the coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

145. The system of Enumerated Example Embodiment 1, the one or more components are operable for processing instructions for:
   determining a third Lagrangian multiplier using a Lagrangian Multiplier Estimation Module of the video encoder; and
   updating the first Lagrangian multiplier with a replacement of the first Lagrangian multiplier with the third Lagrangian multiplier.

146. The system of Enumerated Example Embodiment 1, the one or more components are operable for executing instructions for:
   computing other Lagrangian multipliers for a plurality of macroblocks or regions of macroblocks of a picture; and
   encoding a frame with the video encoder at least partially based on a function of all of the Lagrangian multipliers.

147. The system of Enumerated Example Embodiment 1, wherein determining the first Lagrangian multiplier comprises estimating the first Lagrangian multiplier for a distortion value and a rate value at a coding parameter using rate values and distortion values at coding parameters that neighbor the coding parameter.

148. The system of Enumerated Example Embodiment 1, wherein the coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

149. The system of Enumerated Example Embodiment 1, wherein the rate and distortion values comprise a plurality of QP points, wherein the distortion and values for the plurality of QP points comprise $(D_{QP+l}, R_{QP+l})$ wherein $D_{QP+l}$ represents a distortion value at QP+l, wherein $R_{QP+l}$ represents a rate value at QP+l, wherein l, M, and N represent numbers of the QP points, wherein l comprises $-M, \ldots, -1, 1, \ldots N$, and wherein M and N are pre-selected or adaptively selected.

150. The system of Enumerated Example Embodiment, wherein the pre-selection for the one or more components is at least partially based on available computational resources, and wherein the adaptive selection is at least partially based on available computational resources or video sequence characteristics or regional characteristics, wherein the regional characteristics comprise characteristics of one or more macroblocks.

151. The system of Enumerated Example Embodiment, wherein for each QP point, the one or more components are operable to execute instructions comprising:
   determining a mode where an overall Lagrangian cost function is minimized;
   determining corresponding rate and distortion values $(\tilde{D}_{QP+l}, \tilde{R}_{QP+l})$ for the mode, wherein $\tilde{D}_{QP+l}$ represents a distortion value at QP+l, and wherein $\tilde{R}_{QP+l}$ represents a rate value at QP+l; and
   when the rate and distorting values $(\tilde{D}_{QP+l}, \tilde{R}_{QP+l})$ are determined for the $-M, \ldots, -1, 1, \ldots N$, estimating a slope of a curve at $(D_{QP}, R_{QP})$ using a first order derivative estimation method, wherein $D_{QP}$ represents a distortion value at QP, and wherein $R_{QP}$ represents a rate value at the QP.

152. The system of Enumerated Example Embodiment, wherein the first order derivative estimation method comprises a geometric average of a finite difference at the $(D_{QP}, R_{QP})$.

153. The system of Enumerated Example Embodiment, wherein the first Lagrangian multiplier that is estimated comprises $\lambda_{estimate}$, wherein $$\lambda_{estimate} = \left( \prod_{l=-M, l \neq 0}^{N} \hat{\lambda}_l \right)^{\frac{1}{M+N}},$$

wherein $\hat{\lambda}_l$ comprises a ratio for the l of a difference of distortions and a difference of rates, wherein $$\hat{\lambda}_l = \frac{\tilde{D}_{QP+l} - D_{QP}}{\tilde{R}_{QP+l} - R_{QP}}, l = -M, \ldots, -1, 1, \ldots, N,$$

and wherein $$\prod_{l=-M, l \neq 0}^{N}$$

represents a mode for the l.

154. The system of Enumerated Example Embodiment, wherein the first Lagrangian multiplier that is estimated comprises a comparison of a plurality of Lagrangian costs for one or more candidate modes in the determination of the distortion and rate values.

155. The system of Enumerated Example Embodiment, wherein for each QP point, the one or more components executes a search for a mode where an overall Lagrangian cost function is minimized.

156. The system of Enumerated Example Embodiment, wherein when the one or more components determine the first Lagrangian multiplier, the one or more components perform rate distortion slope estimation with local approximation.

157. The system of Enumerated Example Embodiment, wherein when the one or more components perform the rate distortion slope estimation with local approximation, the operations for the one or more components comprise:
determining a mode $\pi^*$ where an overall Lagrangian cost function is minimized for a current coding parameter with a current Lagrangian multiplier $\lambda_{current}$;
determining distortion and rate values $(\tilde{D}_{QP+l}, \tilde{R}_{QP+l})$ for l, wherein the l comprises $-M, \ldots, -1, 1, \ldots N$, wherein l, M, and N represent numbers for a plurality of QP points, wherein $\tilde{D}_{QP+l}$ represents a distortion value at QP+l, and wherein $\tilde{R}_{QP+l}$ represents a rate value at QP+l; and
estimating a slope of a curve at $(D_{QP}, R_{QP})$ be executing instructions for a first order derivative estimation method, wherein $D_{QP}$ represents a distortion value at QP, and wherein $R_{QP}$ represents a rate value at QP, wherein the coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

158. The system of Enumerated Example Embodiment, wherein the instructions for the first order derivative estimation method comprises a geometric average of a finite difference at the distortion and rate values $(D_{QP}, R_{QP})$.

159. The system of Enumerated Example Embodiment, wherein the first Lagrangian multiplier that is estimated comprises $\lambda_{estimate}$, wherein $$\lambda_{estimate} = \left( \prod_{l=-M, l \neq 0}^{N} \hat{\lambda}_l \right)^{\frac{1}{M+N}},$$

wherein $\hat{\lambda}_l$ comprises a ratio for the l of a difference of distortions and a difference of rates, wherein $$\hat{\lambda}_l = \frac{\tilde{D}_{QP+l} - D_{QP}}{\tilde{R}_{QP+l} - R_{QP}}, l = -M, \ldots, -1, 1, \ldots, N,$$

and wherein $$\prod_{l=-M, l \neq 0}^{N}$$

represents a mode for the l.

160. The system of Enumerated Example Embodiment, wherein the one or more components are operable to determine the distortion and rate values $(\tilde{D}_{QP+l}, \tilde{R}_{QP+l})$ with operations comprising:
setting the distortion value $\tilde{D}_{QP+l}$ as a function of the mode $\pi^*$, a number i for a plurality of QP points, and the quantization parameter QP+l, wherein the distortion value $\tilde{D}_{QP+l}$ comprises $\tilde{D}_{QP+l} = d(i, \pi, QP+l)$;
setting the rate value $\tilde{R}_{QP+l}$ as a function of the mode $\pi^*$, the number i for the plurality of QP points, and the quantization parameter QP+l, wherein the rate value $\tilde{R}_{QP+l}$ comprises $\tilde{R}_{QP+l} = d(i, \pi^*, QP+l)$; and
computing $\hat{\lambda}_l$, wherein $\hat{\lambda}_l$ comprises a ratio for the l of a difference of distortions and a difference of rates, wherein the computing of $\hat{\lambda}_l$ comprises $$\hat{\lambda}_l = \frac{\tilde{D}_{QP+l} - D_{QP}}{\tilde{R}_{QP+l} - R_{QP}}, l = -M, \ldots, -1, 1, \ldots, N.$$

161. The system of Enumerated Example Embodiment, wherein the one or more components determine the first Lagrangian multiplier by using local information to estimate the first Lagrangian multiplier.

162. The system of Enumerated Example Embodiment, wherein the local information comprises a variance, a luma component, a mean of luma component, a chroma component, a motion intensity, texture or edge information, or a characteristic or a Lagrangian multiplier of spatially or temporally neighboring areas of a region or macroblock, wherein a coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

163. The system of Enumerated Example Embodiment, wherein the first Lagrangian multiplier comprises $\lambda_{estimate}$; and the one or more components determine the first Lagrangian multiplier by calculating $\lambda_{estimate}$, wherein $\lambda_{estimate}$ is a function of a local estimation method $f_{local}(\cdot)$ for local information $I_{local}$, wherein $\lambda_{estimate} = f_{local}(I_{local})$.

164. The system of Enumerated Example Embodiment, wherein the one or more components are operable to process operations comprising:
for a macroblock associated with the first Lagrangian multiplier, computing the local information; and
determining the first Lagrangian multiplier at least partially based on the computed local information and the coding parameter.

165. The system of Enumerated Example Embodiment, wherein the first Lagrangian multiplier is determined from a Lagrangian multiplier look-up table stored in the one or more components.

166. The system of Enumerated Example Embodiment, wherein the one or more components are configured to determine the first Lagrangian multiplier by generating a Lagrangian multiplier look-up table, the generation of the Lagrangian multiplier look-up table comprises:
computing a plurality of variances for an area;
estimating a plurality of Lagrangian multipliers for a plurality of quantization parameters (QPs);
arranging the plurality of variances into (K+1) groups with K bins;
arranging the plurality of QPs into groups with L bins;
computing an average Lagrangian multiplier for each of the groups at least partially based on the K and L bins; and
recording the average Lagrangian multipliers within the Lagrangian multiplier look-up table in the one or more components.

167. The system of Enumerated Example Embodiment, wherein the one or more components are configured to adaptively or periodically update the Lagrangian multiplier look-up table for two or more areas, slices, or scenes.

168. The system of Enumerated Example Embodiment, wherein the one or more components are configured to use global infoimation to estimate the first Lagrangian multiplier, wherein a coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

169. The system of Enumerated Example Embodiment, wherein the global information comprises a frame rate, a spatial characteristic, a luma or chroma variance, a DC value, a histogram of a DC value, a current coding structure, metadata information, or a hierarchy level within a current Group of Pictures (GOP).

170. The system of Enumerated Example Embodiment, wherein the first Lagrangian multiplier comprises $\lambda_{estimate}$; and the one or more components are configured to determine the first Lagrangian multiplier by calculating $\lambda_{estimate}$, wherein $\lambda_{estimate}$ is a function of a global estimation method $f_{global}(\cdot)$ for global information $I_{global}$, wherein $\lambda_{estimate} = f_{global}(I_{global})$.

171. The system of Enumerated Example Embodiment, the one or more components are operable to process operations for the first Lagrangian multiplier further comprising:
computing the global information; and
determining the first Lagrangian multiplier at least partially based on the computed global information and a coding parameter.

172. The system of Enumerated Example Embodiment, wherein determining the first Lagrangian multiplier at least partially based on the computed global information and the coding parameter comprises an adjustment of the first Lagrangian multiplier that is at least partially based on temporal characteristics, sequences, or coding differences between pictures or regions.

173. The system of Enumerated Example Embodiment, wherein the one or more components are configured to determine the first Lagrangian multiplier by processing a function of the coding parameter and a hierarchical level of pictures, wherein the first Lagrangian multiplier is $\lambda_k$.

174. The system of Enumerated Example Embodiment, wherein the one or more components are configured to determine the first Lagrangian multiplier with operations comprising:
setting the first Lagrangian multiplier $\lambda_k$ as a function of the hierarchical level, a step size of a change between pictures for a Group of Pictures (GOP), and an anchor picture for the GOP, wherein k represents the hierarchical level, $\Delta_{GOP}$ represents the step size of a change between pictures for the GOP, and $\lambda_{anchor}$ represents the anchor picture for the GOP, wherein $\lambda_k = (1 - k \cdot \Delta_{GOP}) \cdot \lambda_{anchor}$; and
computing the first Lagrangian multiplier.

175. The system of Enumerated Example Embodiment, wherein the one or more components are configured to determine the first Lagrangian multiplier with operations comprising:
setting the first Lagrangian multiplier $\lambda_k$ as a function of the Lagrangian multiplier of an anchor picture and a ratio of a distance of the anchor picture and a distance in the GOP, wherein k represents the hierarchical level, $\lambda_{anchor}$ represents the Lagrangian multiplier of anchor picture for the GOP, and $d_{anchor}$ represents the distance of the anchor picture; and $d_{GOP}$ represents the distance in the GOP, wherein $$\lambda_k = \frac{d_{anchor}}{d_{GOP}} \cdot \lambda_{anchor};$$

and
computing the first Lagrangian multiplier.

176. The system of Enumerated Example Embodiment, wherein the one or more components are configured to determine the first Lagrangian multiplier with operations comprising determining a Lagrangian multiplier for one or more pictures for a Group of Pictures (GOP) at least partially based on a distance to an anchor picture.

177. The system of Enumerated Example Embodiment, wherein the one or more components are configured to determine the first Lagrangian multiplier with operations comprising using a Lagrangian multiplier look-up table stored in the one or more components.

178. The system of Enumerated Example Embodiment, wherein the Lagrangian multiplier look-up table is at least partially based on a plurality of coding parameters.

179. The system of Enumerated Example Embodiment, wherein the one or more components are configured to update the first Lagrangian multiplier at least partially based on a plurality of Lagrangian multipliers in the Lagrangian multiplier look-up table.

180. The system of Enumerated Example Embodiment, wherein the one or more components are configured to determine the first Lagrangian multiplier by processing a function of translating a previous hierarchical structure for a Group of Pictures (GOP) with a subsequent hierarchical structure for the GOP.

181. The system of Enumerated Example Embodiment, wherein the one or more components are configured to update the second Lagrangian multiplier by:
estimating the first Lagrangian multiplier with a Lagrangian Multiplier Estimation Module of the video encoder; and
replacing the second Lagrangian multiplier with the first Lagrangian multiplier.

182. The system of Enumerated Example Embodiment, wherein the one or more components are configured to update the second Lagrangian multiplier by changing the second Lagrangian multiplier in a series of Lagrangian steps to change the second Lagrangian multiplier to the first Lagrangian multiplier at an end of the series.

183. The system of Enumerated Example Embodiment, wherein updating of the second Lagrangian multiplier comprises one or more operations for computing an updated second Lagrangian multiplier $\lambda_{new}$ that is a function of the first Lagrangian multiplier $\lambda_{estimate}$ and the second Lagrangian multiplier $\lambda_{current}$, wherein $\lambda_{new} = \lambda_{current} + \Delta \cdot (\lambda_{estimate} - \lambda_{current})$, and wherein the $\Delta$ comprises a value that is preset or adaptively changed, and wherein $0 < \Delta < 1$, 184. The system of Enumerated Example Embodiment, wherein updating the second Lagrangian multiplier comprises one or more operations for placing a limit on a size of an update of the second Lagrangian multiplier by setting an upper bound or a lower bound on updates to the second Lagrangian multiplier.

185. The system of Enumerated Example Embodiment, wherein the one or more components are configured to update the second Lagrangian multiplier by computing a sliding window average of a plurality of Lagrangian multipliers in one or more previous macroblocks and a current macroblock.

186. The system of Enumerated Example Embodiment, wherein the one or more components are configured to:
for the plurality of Lagrangian multipliers, select a subset of the Lagrangian multipliers for a sliding window of Lagrangian multipliers; and
update the second Lagrangian multiplier as a function of an average of the sliding window.

187. The system of Enumerated Example Embodiment, wherein updating the second Lagrangian multiplier with the first Lagrangian multiplier comprises updating the second Lagrangian multiplier periodically, wherein a period of the update comprises a fixed period or an adaptively-changing period.

188. The system of Enumerated Example Embodiment, wherein the period is dependent upon a local context, wherein the local context comprises motion intensity or scene cut information.

189. The system of Enumerated Example Embodiment, wherein the one or more components are configured to update the second Lagrangian multiplier at a start of a slice.

190. The system of Enumerated Example Embodiment, wherein the one or more components are configured to update the second Lagrangian multiplier when a scene cut is detected.

191. The system of Enumerated Example Embodiment, wherein the one or more components are configured to update the second Lagrangian multiplier with operations comprising:
computing a variance of at least two macroblocks with the video encoder; and
updating the second Lagrangian multiplier if a change of the variance between two adjacent macroblocks exceeds a threshold value.

192. The system of Enumerated Example Embodiment, wherein updating the second Lagrangian multiplier comprises operations for updating the second Lagrangian multiplier for a number of periods, pictures, or regions of a picture.

193. The system of Enumerated Example Embodiment, wherein the one or more components are configured to update the second Lagrangian multiplier with operations comprising executing different types of updates of the second Lagrangian multiplier in a random order or a fixed order, wherein the different types of updates comprise a direct update, a step size update, and a sliding widow update.

194. The system of Enumerated Example Embodiment, wherein the one or more components are configured to update the second Lagrangian multiplier with operations comprising using a Lagrangian Multiplier Update Module of the video encoder; and coding a region of the video using the second Lagrangian multiplier.

195. The system of Enumerated Example Embodiment, wherein the one or more components are configured to determine the first Lagrangian multiplier by computing a plurality of distortion metrics.

196. The system of Enumerated Example Embodiment, wherein the one or more components are configured to process instructions for operations comprising:
determining a first group of Lagrangian multipliers with the video encoder; and
updating a second group of Lagrangian multipliers with the first group of Lagrangian multipliers.

197. The system of Enumerated Example Embodiment, wherein a plurality of distortion or/and complexity metrics are employed in determining the first group of Lagrangian multipliers.

198. The system of Enumerated Example Embodiment, wherein the one or more components are configured to determine the first group of Lagrangian multipliers by computing a rate distortion slope with two or more dimensions and one or more coding parameters, wherein the one or more coding parameters comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

Several example embodiments of the disclosure have been described, other embodiments are within the scope of the following claims.

What is claimed is:

1. A method for encoding video information, the method comprising:
determining a first Lagrangian multiplier with a video encoder, wherein determining the first Lagrangian multiplier comprises estimating the first Lagrangian multiplier by using at least global information, the estimation of the first Lagrangian multiplier comprising calculating $\lambda_{estimate}$, wherein $\lambda_{estimate}$ is a function of a global estimation method $f_{global}(\cdot)$ for global information $I_{global}$, wherein $\lambda_{estimate}=f_{global}(I_{global})$, and wherein the global information comprises a frame rate, or a current coding structure, or a hierarchy level within a current Group of Pictures (GOP);

initializing a second Lagrangian multiplier; and updating the second Lagrangian multiplier with the first Lagrangian multiplier, wherein the updated second Lagrangian multiplier is a function of the first Lagrangian multiplier and the current second Lagrangian multiplier;

wherein the video encoder encodes video information according to the updated second Lagrangian multiplier.

2. The method of claim 1, wherein:

the first Lagrangian multiplier is estimated for a distortion value and a rate value at a coding parameter further using rate values and distortion values at coding parameters that neighbor the coding parameter, wherein each coding parameter comprises any combination of the following: one or more quantization parameters (QPs), one or more frame rates, one or more resolutions, one or more coding layers, a function of one or more QPs, a function of one or more frame rates, a function of one or more resolutions, or a function of one or more coding layers.

3. The method of claim 2, wherein the rate and distortion values comprise a plurality of QP points, the distortion and values for the plurality of QP points comprise $(D_{QP+l}, R_{QP+l})$, wherein $D_{QP+l}$ represents a distortion value at QP+l, wherein $R_{QP+l}$ represents a rate value at QP+l, l, M, and N represent numbers of the QP points, wherein l comprises $-M, \ldots, -1, 1, \ldots N$, for which M and N are pre-selected or adaptively selected, the pre-selection is at least partially based on available computational resources, the adaptive selection is at least partially based on available computational resources or video sequence characteristics or regional characteristics, and the regional characteristics comprise characteristics of one or more macroblocks.

4. The method of claim 3, wherein estimating the first Lagrangian multiplier for the distortion value and the rate value at the coding parameter using rate values and distortion values at coding parameters that neighbor the coding parameter comprises, for each QP point:

determining a mode where an overall Lagrangian cost function is minimized;

determining corresponding rate and distortion values $(\tilde{D}_{QP+l}, \tilde{R}_{QP+l})$ for the mode, wherein $\tilde{D}_{QP+l}$ represents a distortion value at QP+l, and wherein $\tilde{R}_{QP+l}$ represents a rate value at QP+l; and when the rate and distorting values $(\tilde{D}_{QP+l}, \tilde{R}_{QP+l})$ are determined for the $-M, \ldots, -1, 1, \ldots N$, estimating a slope of a curve at $(D_{QP}, R_{QP})$ using a first order derivative estimation method, wherein $D_{QP}$ represents a distortion value at QP, and wherein $R_{QP}$ represents a rate value at the QP, wherein the first order derivative estimation method comprises a geometric average of a finite difference at the $(D_{QP}, R_{QP})$.

5. The method of claim 3, wherein estimating the first Lagrangian multiplier for the distortion value and the rate value at the coding parameter using rate values and distortion values at coding parameters that neighbor the coding parameter comprises the first Lagrangian multiplier that is estimated as $\lambda_{estimate}$, wherein $$\lambda_{estimate} = \left(\prod_{l=-M, l \neq 0}^{N} \hat{\lambda}_l\right)^{\frac{1}{M+N}},$$

wherein $\hat{\lambda}_l$ comprises a ratio for the l of a difference of distortions and a difference of rates, wherein $$\hat{\lambda}_l = \frac{\tilde{D}_{QP+l} - D_{QP}}{\tilde{R}_{QP+l} - R_{QP}}, l = -M, \ldots, -1, 1, \ldots, N,$$

and wherein $$\prod_{l=-M, l \neq 0}^{N}$$

represents a mode for the l.

6. The method of claim 5, wherein the first Lagrangian multiplier that is estimated comprises comparing a plurality of Lagrangian costs for one or more candidate modes to determine the distortion and rate values.

7. The method of claim 3, wherein for each QP point, the method further comprises searching for a mode where an overall Lagrangian cost function is minimized.

8. The method of claim 1, wherein, when using global information to estimate the first Lagrangian multiplier, determining the first Lagrangian multiplier further comprises:

computing the global information; and determining the first Lagrangian multiplier at least partially based on the computed global information and a coding parameter, and wherein determining the first Lagrangian multiplier at least partially based on the computed global information and the coding parameter comprises adjusting the first Lagrangian multiplier at least partially based on temporal characteristics, sequences, or coding differences between pictures or regions.

9. The method of claim 1, wherein, when using global information to estimate the first Lagrangian multiplier, the method comprises determining the first Lagrangian multiplier that comprises a function of the coding parameter and a hierarchical level of pictures, wherein the first Lagrangian multiplier is $\lambda_k$.

10. The method of claim 9, wherein determining the first Lagrangian multiplier further comprises at least one of:

A) setting the first Lagrangian multiplier $\lambda_k$ as a function of the hierarchical level, a step size of a change between pictures for a Group of Pictures (GOP), and an anchor picture for the GOP, wherein k represents the hierarchical level, $\Delta_{GOP}$ represents the step size of a change between pictures for the GOP, and $\lambda_{anchor}$ represents the anchor picture for the GOP, wherein $\lambda_k = (1 - k \cdot \Delta_{GOP}) \cdot \lambda_{anchor}$; and computing the first Lagrangian multiplier, or B) setting the first Lagrangian multiplier $\lambda_k$ as a function of the Lagrangian multiplier of an anchor picture and a ratio of a distance of the anchor picture and a distance in the GOP, wherein k represents the hierarchical level, $\lambda_{anchor}$ represents the Lagrangian multiplier of anchor picture for the GOP, and $d_{anchor}$ represents the distance of the anchor picture; and $d_{GOP}$ represents the distance in the GOP, wherein $$\lambda_k = \frac{d_{anchor}}{d_{GOP}} \cdot \lambda_{anchor};$$

and computing the first Lagrangian multiplier.

11. The method of claim 9, wherein determining the first Lagrangian multiplier further comprises at least one of:
  determining a Lagrangian multiplier for one or more pictures for a Group of Pictures (GOP) at least partially based on a distance to an anchor picture, or
  determining the first Lagrangian multiplier from a Lagrangian multiplier look-up table, wherein the Lagrangian multiplier look-up table is at least partially based on a plurality of coding parameters and the first Lagrangian multiplier is updated at least partially based on a plurality of Lagrangian multipliers in the Lagrangian multiplier look-up table, or
  a function of translating a previous hierarchical structure for a Group of Pictures (GOP) with a subsequent hierarchical structure for the GOP.

12. The method of claim 1, wherein updating the second Lagrangian multiplier comprises:
  computing the updated second Lagrangian multiplier $\lambda_{new}$ as the function of the first Lagrangian multiplier $\lambda_{estimate}$ and the second Lagrangian multiplier $\lambda_{current}$, wherein $\lambda_{new} = \lambda_{current} + \Delta \cdot (\lambda_{estimate} - \lambda_{current})$, and wherein the $\Delta$ comprises a value that is preset or adaptively changed, and wherein $0 < \Delta < 1$.

13. The method of claim 1, wherein updating the second Lagrangian multiplier comprises placing a limit on a size of an update of the second Lagrangian multiplier by setting an upper bound or a lower bound on updates to the second Lagrangian multiplier.

14. The method of claim 1, wherein updating the second Lagrangian multiplier comprises: computing a sliding window average of a plurality of Lagrangian multipliers in one or more previous macroblocks and a current macroblock;
  for the plurality of Lagrangian multipliers, selecting a subset of the Lagrangian multipliers for a sliding window of Lagrangian multipliers; and
  updating the second Lagrangian multiplier as a function of an average of the sliding window.

15. The method of claim 1, wherein the second Lagrangian multiplier is periodically updated with the first Lagrangian multiplier, the method further comprising:
  a period that depends on a local context, wherein the local context comprises motion intensity or scene cut information,
  providing the second Lagrangian multiplier that is updated at a start of a slice,
  providing the second Lagrangian multiplier that is updated when a scene cut is detected,
  computing a variance of at least two macroblocks with the video encoder and updating the second Lagrangian multiplier if a change of the variance between two adjacent macroblocks exceeds a threshold value,
  updating the second Lagrangian multiplier for a number of periods, pictures, or regions of a picture, or
  executing different types of updates of the second Lagrangian multiplier in a random order or a fixed order, wherein the different types of updates comprise a direct update, a step size update, and a sliding widow update.

16. The method of claim 1, further comprising:
  determining a first group of Lagrangian multipliers with the video encoder; and
  updating a second group of Lagrangian multipliers with the first group of Lagrangian multipliers,
  wherein:
    a plurality of distortion constraints are employed in determining the first group of Lagrangian multipliers,
    determining the first group of Lagrangian multipliers comprises computing a rate distortion slope with two or more dimensions and one or more coding parameters.

17. An encoder for video information, comprising:
  at least one processor; and
  a computer readable storage medium that comprises instructions that, when executed by the at least one processor, cause the processor to perform a process, the process comprising:
  determining a first Lagrangian multiplier with a video encoder, wherein determining the first Lagrangian multiplier comprises estimating the first Lagrangian multiplier by using at least global information, the estimation of the first Lagrangian multiplier comprising calculating $\lambda_{estimate}$, wherein $\lambda_{estimate}$ is a function of a global estimation method $f_{global}(\cdot)$ for global information $I_{global}$, wherein $\lambda_{estimate} = f_{global}(I_{global})$, and wherein the global information comprises a frame rate, or a current coding structure, or a hierarchy level within a current Group of Pictures (GOP);
  initializing a second Lagrangian multiplier; and
  updating the second Lagrangian multiplier with the first Lagrangian multiplier, wherein the updated second Lagrangian multiplier is a function of the first Lagrangian multiplier and the current second Lagrangian multiplier;
  wherein the video encoder encodes video information according to the updated second Lagrangian multiplier.

18. An apparatus for encoding video information, comprising:
  at least one processor; and
  a computer readable storage medium that comprises instructions that, when executed by the at least one processor, cause the processor to perform, at least partially, a process, the process comprising:
  determining a first Lagrangian multiplier with a video encoder, wherein determining the first Lagrangian multiplier comprises estimating the first Lagrangian multiplier by using at least global information, the estimation of the first Lagrangian multiplier comprising calculating $\lambda_{estimate}$, wherein $\lambda_{estimate}$ is a function of a global estimation method $f_{global}(\cdot)$ for global information $I_{global}$, wherein $\lambda_{estimate} = f_{global}(I_{global})$ and wherein the global information comprises a frame rate, or a current coding structure, or a hierarchy level within a current Group of Pictures (GOP);
  initializing a second Lagrangian multiplier; and
  updating the second Lagrangian multiplier with the first Lagrangian multiplier, wherein the updated second Lagrangian multiplier is a function of the first Lagrangian multiplier and the current second Lagrangian multiplier;
  wherein the video encoder encodes video information according to the updated second Lagrangian multiplier.

19. A non-transitory computer readable storage medium or software product comprising instructions, which when executing with at least one processor of a computer system, cause the processor to perform, at least partially, a process, the process comprising:
  determining a first Lagrangian multiplier with a video encoder, wherein determining the first Lagrangian multiplier comprises estimating the first Lagrangian multiplier by using at least global information, the estimation of the first Lagrangian multiplier comprising calculating $\lambda_{estimate}$, wherein $\lambda_{estimate}$ is a function of a global estimation method $f_{global}(\cdot)$ for global information $I_{global}$, wherein $\lambda_{estimate} = f_{global}(I_{global})$ and wherein the global information comprises a frame rate, or a current coding structure, or a hierarchy level within a current Group of Pictures (GOP);

initializing a second Lagrangian multiplier; and updating the second Lagrangian multiplier with the first Lagrangian multiplier, wherein the updated second Lagrangian multiplier is a function of the first Lagrangian multiplier and the current second Lagrangian multiplier;

wherein the video encoder encodes video information according to the updated second Lagrangian multiplier.

20. A computer system, comprising:

means for determining a first Lagrangian multiplier with a video encoder, wherein determining the first Lagrangian multiplier comprises estimating the first Lagrangian multiplier by using at least global information, the estimation of the first Lagrangian multiplier comprising calculating $\lambda_{estimate}$, wherein $\lambda_{estimate}$ is a function of a global estimation method $f_{global}(\cdot)$ for global information $I_{global}$, wherein $\lambda_{estimate} = f_{global}(I_{global})$ and wherein the global information comprises a frame rate, or a current coding structure, or a hierarchy level within a current Group of Pictures (GOP);

means for initializing a second Lagrangian multiplier; and means for updating the second Lagrangian multiplier with the first Lagrangian multiplier, wherein the updated second Lagrangian multiplier is a function of the first Lagrangian multiplier and the current second Lagrangian multiplier;

wherein the computer system encodes video information according to the updated second Lagrangian multiplier.

* * * * *